(12) United States Patent
Takada et al.

(10) Patent No.: US 6,582,070 B2
(45) Date of Patent: Jun. 24, 2003

(54) RECORDING UNIT AND IMAGE RECORDING APPARATUS

(75) Inventors: Yoichi Takada, Kanagawa (JP); Teruo Ozaki, Kanagawa (JP); Nobuyuki Matsumoto, Tokyo (JP); Masao Kato, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/942,578

(22) Filed: Aug. 31, 2001

(65) Prior Publication Data

US 2002/0060721 A1 May 23, 2002

(30) Foreign Application Priority Data

Sep. 4, 2000 (JP) .......................... 2000-267796
Sep. 4, 2000 (JP) .......................... 2000-267815

(51) Int. Cl.[7] .............................. B41J 2/01; B41J 2/05
(52) U.S. Cl. ......................... 347/100; 347/65; 347/43
(58) Field of Search ................... 347/100, 96, 101, 347/43, 45, 44, 47, 65

(56) References Cited

U.S. PATENT DOCUMENTS

| 4,335,389 | A |   | 6/1982  | Shirato et al. ............. 347/64 |
| 4,429,321 | A |   | 1/1984  | Matsumoto |
| 4,723,129 | A | * | 2/1988  | Endo et al. ............... 347/65 |
| 5,278,585 | A | * | 1/1994  | Karz et al. ............... 347/43 |
| 5,428,383 | A | * | 6/1995  | Shields et al. ............ 347/100 |
| 5,455,612 | A |   | 10/1995 | Ikeda et al. .............. 347/64 |
| 5,580,468 | A |   | 12/1996 | Fujikawa et al. ........... 216/27 |
| 5,599,386 | A |   | 2/1997  | Sano et al. ............... 106/22 R |
| 5,734,403 | A |   | 3/1998  | Suga et al. ............... 347/101 |
| 5,821,962 | A | * | 10/1998 | Kudo et al. ............... 347/65 |
| 5,976,230 | A |   | 11/1999 | Askeland et al. ........... 106/31.27 |
| 6,221,141 | B1 |  | 4/2001  | Takada et al. ............. 106/31.6 |
| 6,280,513 | B1 | * | 8/2001  | Osumi et al. .............. 106/31.6 |

FOREIGN PATENT DOCUMENTS

| EP | 0879857 A2 | * | 11/1998 | .......... C09D/11/00 |
| EP | 0913438 A1 | * | 5/1999  | .......... C09D/11/00 |
| EP | 1 090 758 A2 |   | 4/2001 | |
| EP | 1 090 760 A1 |   | 4/2001 | |
| EP | 1 177 899 A1 |   | 2/2002 | |
| JP | 02-016171  | * | 1/1990  | .......... C09D/11/00 |
| JP | 6-171208 A |   | 6/1994  | |
| JP | 8-73791 A  |   | 3/1996  | |
| JP | 11-209673 A |  | 8/1999  | |

* cited by examiner

*Primary Examiner*—Anh T. N. Vo
*Assistant Examiner*—Manish S. Shah
(74) *Attorney, Agent, or Firm*—Fitzpatrick, Cella, Harper & Scinto

(57) ABSTRACT

A recording unit is provided which includes an ink housing part for housing an ink containing a coloring material and an aqueous medium, and an ink jet head part for discharging an ink droplet of the ink, wherein at least one color of the ink is a polyvalent metal salt containing ink further containing a polyvalent metal salt; the ink jet head part for discharging at least the polyvalent metal salt containing ink has a configuration comprised of a substrate having on a base body, a heat-generating resistor member forming a heat-generating part, an electrode wire electrically connected to the heat-generating resistor member, and a cavitation resistant film provided on the heat-generating resistor member and the electrode wire via an insulating protection layer, and a liquid flow path communicating with a discharge port for discharging an ink droplet provided corresponding to the heat-generating part; and the cavitation resistant film includes a layer comprised of an amorphous alloy containing Ta and a layer comprised of an amorphous body of an amorphous alloy which is rich in Ta than the amorphous alloy containing Ta or a passive matter of the amorphous body provided on the layer comprised of the amorphous alloy containing Ta.

60 Claims, 16 Drawing Sheets

RECORDING UNIT AND IMAGE RECORDING APPARATUS

BACKGROUND OF THE INVENTION

1. Field of the Invention

The present invention relates to a recording unit and an image recording apparatus.

2. Related Background Art

The ink jet recording method is a low-noise and non-impact recording method to record an image by discharging an ink directly on a recording medium. Further, this method does not require a complicated apparatus in operation and hence, a low running cost, miniaturization of the apparatus, and color printing are easy to realize Therefore, recording apparatuses such as a printer, a copier, a facsimile, a word processor, and the like, to which the ink jet recording method is applied, have been so far put into practical use. By applying such ink jet recording technology, color ink jet recording apparatuses to form a multicolor image using a black ink and a color ink (for example, at least one color ink chosen from a yellow ink, a cyan ink, a magenta ink, a red ink, a green ink, and a blue ink) have also been put into practical use.

On the other hand, the ink jet recording method has a problem that when different two kinds of inks are applied to the recording medium, the inks are mixed with each other on a boundary part between them to cause a phenomenon (bleeding) of lowering a quality of a color image. Particularly, color mixing on the boundary part between the black ink and the color ink considerably influences lowering of the quality of the color image and thus, various methods for solving this problem have been developed.

A representative method for solution is to employ an ink set and a recording method which have, when two kinds of inks are adjacently applied to the recording medium, mechanisms to cause thickening of at least either one or agglomeration and precipitation of at least either one coloring material to prevent bleeding.

For instance, U.S. Pat. No. 5,428,383 discloses that one ink contains a precipitant (for example, a polyvalent metal salt) and a colorant in a form of an organic dye having a carboxyl and/or carboxylate group is adopted for the other ink, preferably the black ink. It is described that when printing is carried out using these inks in adjacent positions each other, a first ink containing the precipitant precipitates the colorant having a carboxyl and/or carboxylate group to prevent movement of the colorant to the other ink, resulting in reduction of bleeding in adjacent two printing areas.

In addition, U.S. Pat. No. 5,976,230 discloses a technology in which applying two kinds of inks reactive to each other to the same area prevents bleeding.

Difference in concentration

By the inventors' study, it has been confirmed that, as described in the U.S. Pat. No. 5,976,230 described above, in an image yielded by applying two kinds of inks reactive to each other to the same area, the density thereof becomes higher than that of an image produced by an single ink. Also, Japanese Patent Application Laid-Open No 6-171208 filed by the applicant of the present application discloses that shooting a pigment-based black ink and a color ink containing a salt on the same position of a recording medium by the ink jet method yields an image with a density higher than that of a black image formed by using a black ink alone. No problem occurs by an increase in the image density by overlaying of reactive ink sets.

However, when a part formed with a black ink and a part formed by a blend of a color ink and the black ink coexist in a black area in the same document, the image density of black may differ from each other to result in a visually abnormal image. More specifically, when in one document, a black character part (a first character part) having no color background and a black character part (a second character part) having a color background exist and the first character part is formed by a black ink alone and the second character part is formed, in viewpoint of bleeding prevention and according to the method disclosed in U.S. Pat. No. 5,976,230 described above, by overlaying of the black ink and a color ink having the reactivity with the black ink, the density of the first character part and the density of the second character part visually differ from each other distinctly to cause abnormal feeling in some occasions.

As one of the methods for solving this problem a treatment method in which, all black image areas, namely, the first character part in the example described above, is shot with a color ink having mutual reactivity with a black ink to fix the black ink. In this case, a consumption of the color ink increases and the color ink shot in advance has normally high penetrability and therefore, the color ink more easily spreads than the black ink on a recording medium, occasionally resulting in that, for example, in the black character part, the character is visually recognized as outlined by the color ink.

As a result of study in light of the findings described above, the inventors found a technique capable of improving the density of an image formed with a black ink alone almost equal to the density of the image yielded by blending a color ink reactive to the black ink with the black ink and also the technique, which is necessary for the ink jet recording, keeping a color balance after long time conservation of a color-recorded image formed, capable of effective prevention of occurrence of bleeding, and capable of maintaining these functions with good durability.

In addition, a configuration of an ink jet head to be more suitably used when an ink set comprising such a combination of a black ink and a color ink was used, was examined. As a result, the present inventors have concluded that, when using a polyvalent metal salt as a component to impart reactivity between two different kinds of inks, in order to increase durability of a part contacting with the ink, particularly a part on a heat-generating member, in a liquid flow path of the ink jet head, the configuration of the part contacting with the ink containing the polyvalent metal salt is important. And, as such a configuration, formation of an anti-cavitation film having a face contacting with the ink in a form of two layers, of which an upper layer contacting with the ink is made of Ta or TaAl and a lower layer is made of an amorphous alloy containing Ta, was found to be effective for further improving discharge durability for the ink containing the polyvalent metal.

The present invention was created on the basis of the findings by the present inventors.

SUMMARY OF THE INVENTION

An object of the present invention is to provide a recording unit and an image recording apparatus, which have a configuration capable of improving discharge durability even when an ink containing a polyvalent metal salt is used, while keeping an advantage of using a polyvalent metal salt.

Another object of the present invention is to provide the recording unit and the image recording apparatus capable of improving discharge durability while keeping the above-described feature of using a black ink and a color ink containing a polyvalent metal salt reactive to the black ink.

A further object of the present invention is to provide a recording unit and an image recording apparatus capable of keeping a color balance after long conservation term of a recorded image formed, preventing effectively an occurrence of bleeding, and keeping durably these functions by using an ink set with almost equal fading property ΔE of each color ink in case of conserving for a long term.

A still further object of the present invention is to provide a recording unit and an image recording apparatus capable of showing effectively an effect of eliminating a difference in density of an image between a part recorded by a blend of the black ink and the color ink reactive to the black ink as described above and a part recorded by using the black ink alone also in high speed printing by improving shooting precision in high speed printing.

The objects described above can be achieved by the present invention described below. A recording unit according to the present invention comprises an ink housing part for housing an ink containing a coloring material and an aqueous medium, and an ink jet head part for discharging an ink droplet of the ink, wherein the ink is a polyvalent metal salt containing ink further containing a polyvalent metal salt; the ink jet head part has a configuration comprised of a substrate having on a base body, a heat-generating resistor member forming a heat-generating part, an electrode wire electrically connected to the heat-generating resistor member, and an cavitation resistant film provided on the heat-generating resistor member and the electrode wire via an insulating protection layer, a liquid flow path communicating with a discharge port for discharging an ink droplet provided corresponding to the heat-generating part; and the cavitation resistant film comprises at least two layers, of which an upper layer contacting with the ink is a Ta film or a TaAl film, and a lower layer is a layer of an amorphous alloy containing Ta.

Further, an image forming apparatus according to the present invention is an image forming apparatus comprising an ink jet head for discharging an ink containing a coloring material and an aqueous medium, wherein the above-described ink is a polyvalent metal containing ink containing a polyvalent metal salt; the ink jet head part has a configuration comprised of a substrate having on a base body, a heat-generating resistor member forming a heat-generating part, an electrode wire electrically connected to the heat-generating resistor member, and a cavitation resistant film provided on the heat-generating resistor member and the electrode wire via an insulating protection layer, a liquid flow path communicating with a discharge port for discharging an ink droplet provided corresponding to the heat-generating part, the cavitation resistant film comprises at least two layers, of which an upper layer contacting with the ink is a Ta film or a TaAl film and a lower layer is a layer of an amorphous alloy containing Ta.

According to the present invention, for example, by adopting combination of a black ink and a color ink containing a polyvalent metal salt reactive to the black ink, it is realized effects that none of bleeding and white haze occurs in a boundary region between the black ink and other color ink and that a black image formed by overlaying the color ink on the black ink for prevention of bleeding can be formed in a very high density almost the same as that of a black image formed by using the black ink alone to yield a high quality image presenting visually evenness. Further, the cavitation resistant film formed by at least two layers, of which an upper layer contacting with the ink is a Ta film or a TaAl film and a lower layer is a layer of an amorphous alloy containing Ta, is used at a part contacting with the ink on at least the heat-generating resistor member in the liquid flow path of the ink jet head, whereby discharge durability can be further improved keeping such effects.

In other words, in case of using the ink containing a polyvalent metal salt, the part contacting with the ink may corrode during use for a long term to disorder discharge stability and cause deterioration of discharge performance in some occasions corresponding to a material quality thereof. In contrast, by using the cavitation resistant film according to the present invention, durability in the part contacting with the ink is kept to make it possible to further continuously maintain the effect yielded by using the ink containing the polyvalent metal salt. The ink jet head is adapted to the configuration in which a movable member displaceable a position thereof in accordance with occurrence of a bubble in the ink is provided in a region corresponding to the heat-generating member in the liquid flow path, precise shooting of the ink droplet is achieved even in high speed printing, a mixed color itself in the boundary region between the black ink and the color ink is reduced to reduce the occurrence of bleeding and also the difference between density of the image by single use of the black ink using the polyvalent metal salt and the density of the image by blend of the black ink and the color ink is eliminated and thus, the occurrence of bleeding is further effectively reduced.

The reason why the above described effect is obtained in case of applying the combination of the black ink containing the salt and the color ink containing the polyvalent metal salt is that the black ink applied to the recording medium causes rapidly solid-liquid separation in the ink by the salt to left a pigment as a satisfactory solid matter on a surface of the recording medium and as the result, the density increase prominently than an optical density of the image formed by the conventional black ink, in which no salt is contained and the pigment penetrates in an inside of the recording medium, in a high degree not reproducible by adjustment of the density of the coloring material. In addition, the optical density of the image formed by the black ink containing the salt alone presents the high optical density as visually almost equal to the optical density of the image in case where the black ink agglomerates on the recording medium.

In addition, also in case of applying the black ink and the color ink by overlaying to express a monotonous gradation, the following problem takes place: the conventional art causes the difference in optical density by the same reason described above and therefore, in order to make a smooth tone expression, a composition ratio of the black ink and the color ink is limited to cause decrease in a degree of freedom and deterioration of the smooth tone expression itself. However, applying the present invention allows making almost the same as the optical density of the part in which the black ink agglomerates and the optical density of the part formed by only the black ink and therefore, by adjusting a proportion of the color ink added to the black ink, a desired tone expression can be realized and also other effect that the image of a more excellent multigradation expression can be realized is yielded.

BRIEF DESCRIPTION OF THE DRAWINGS

FIGS. 5A, 5B1 and 5B2 are views showing a change of the cavitation resistant film for the ink having a high Ta corrosive property, corresponding to increase in a pulse number for actuating a heat-generating member;

FIGS. 14A, 14B, and 14C show a step for fixing the ink to the recording medium, when after the black ink which difficultly penetrates in the recording medium is applied, the color ink easily penetrable is applied. FIGS. 14D, 14E, and 14F show the step for fixing the ink to the recording medium, when after the color ink easily penetrable in the recording medium is applied, the black ink which difficultly penetrates is applied;

DETAILED DESCRIPTION OF THE PREFERRED EMBODIMENTS

Figure 1A:
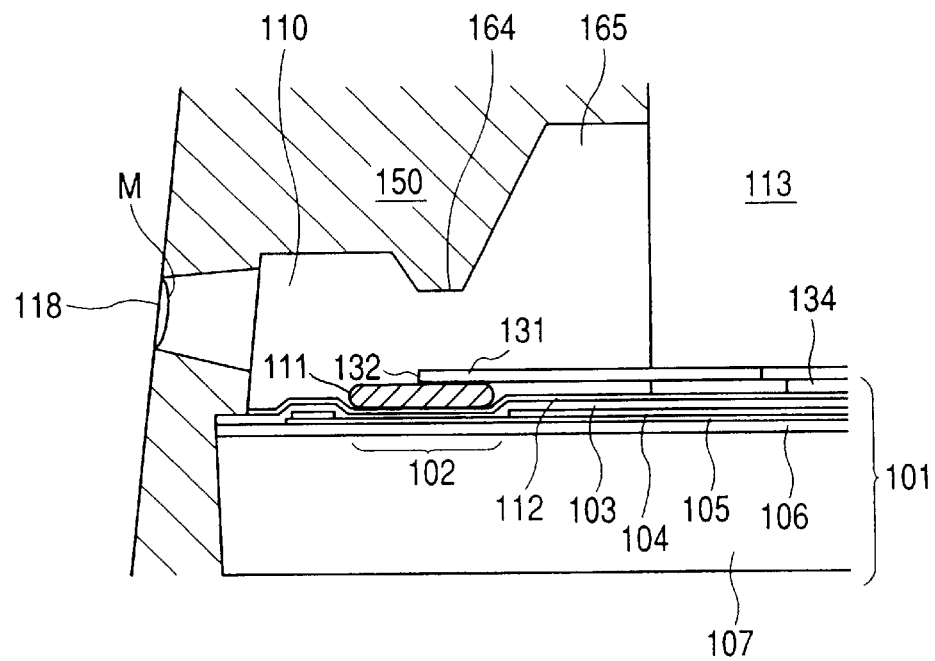
FIGS. 1A and 1B are longitudinal section views of an example of an ink jet head.

The present invention will be described below with reference to the example of case using a color ink, of which the composition is adjusted to make unstable the dispersion stability of the coloring material in a black ink, and the black ink containing a salt in blending the color ink with the black ink.

Unstabilization of the dispersion stability of the coloring material in the black ink in such ink combination is, specifically, agglomeration of the coloring material, precipitation, or thickening of the black ink, and the like. Thickening is a phenomenon takes place in the case where viscosity of the ink prepared by blending the black ink with the color ink becomes higher than viscosity of either of them before blending. Each constitution of the present invention will be described below.

Reactivity of the black ink and the color ink

For the composition of the black ink and the color ink according to the present invention, it is preferable that each is prepared to be adapted to unstabilize the dispersion stability of the coloring material in the black ink described above, when the black ink is blended with the color ink. Specifically, for example, the following implementation is exemplified: the color ink contains the polyvalent metal salt as an additive to unstabilize the dispersion stability of the coloring material in the black ink, when blended with the black ink. As a specific example usable of such combination of the black ink with the color ink, the coloring material in the black ink has an anionic group and the color ink contains at least one kind of a polyvalent metal cation salt containing a polyvalent metal cation, for example, a bivalent metal salt containing a polyvalent metal cation selected from $Mg^{2+}$, $Ca^{2+}$, $Cu^{2+}$, $Co^{2+}$, $Ni^{2+}$, $Fe^{2+}$, $La^{3+}$, $Nd^{3+}$, $Y^{3+}$ and $Al^{3+}$. For the polyvalent metal salt, for example, to supply at least one kind of the bivalent metal salt described above to the ink, one or more kinds among them can be used.

In this example, when the color ink is blended with the black ink, the polyvalent metal cation of the polyvalent metal salt reacts to the anionic group of the coloring material in the black ink and as the result, the coloring material in the black ink causes dispersion break, agglomeration of the coloring material, and thickening of the ink. Where, for the polyvalent metal salt to be contained in the color ink, it is preferable to contain, for example, about 0.1 to 15% by mass to a total mass of the color ink.

And, using such ink set provides the effect in that the difference between densities of the image formed by single use of the black ink and of the image formed by overlaying of the black ink and the color ink to reduce a degree of bleeding allows being made as small as almost invisible by unaided eyes.

The reason why such effect can be yielded will be explained below.

Image formed by black ink and color ink

First of all, the reason, why in order to relax bleeding and white hazes overlaying the pigment black ink on the color ink contains the additive to unstabilize the dispersion stability of the pigment in the black ink allows yielding the high density image, will be explained below.

For treatment to prevent bleeding by using the black ink and the color ink, the following two kinds of methods differing in an order of application of the inks can be exemplified.

Figure 14A:
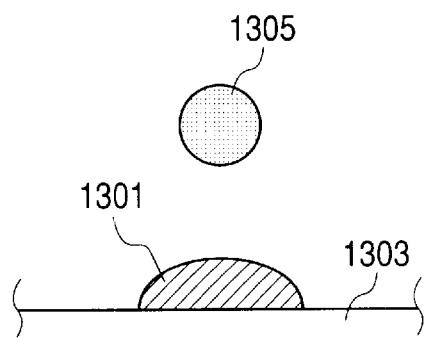
FIGS. 14A, 14B, 14C, 14D, 14E and 14F are schematic views explaining mechanisms by which an uneven recording result caused by reciprocation is very effectively eliminated, when a set of the black ink and the color ink is used.
Figure 14D:
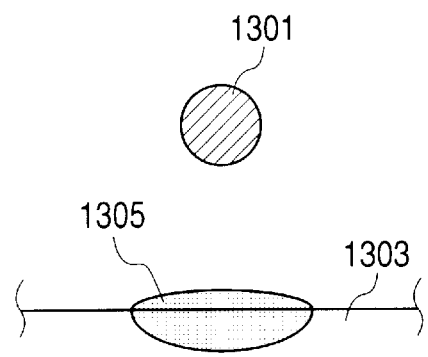
Figure 14B:
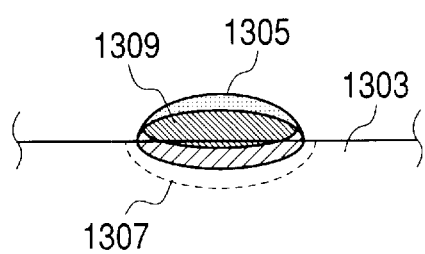
Figure 14E:
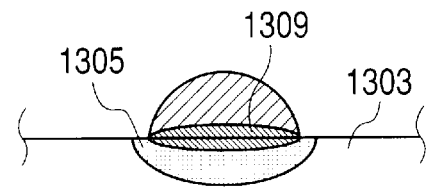
Figure 14C:
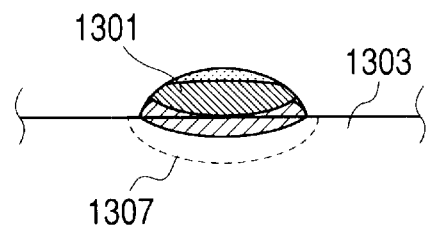
Figure 14F:
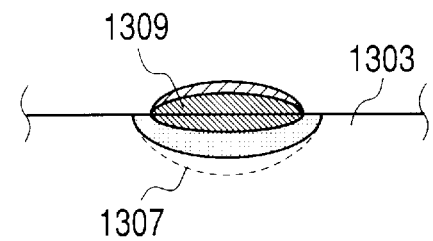

First of all, the phenomenon on the recording medium caused by the method in which the black ink is applied after the color ink is applied will be presented in the FIGS. 14D to 14F. The FIGS. 14D to 14F show an attitude of application of the black ink and the color ink to the same position in case using the black ink containing the salt and the color ink reactive to the black ink.

The black ink 1301 is applied to a surface of the recording medium 1303 of which penetrability has been increased by the color ink 1305 and thus, the black ink 1301 penetrates rapidly in the inside of the recording medium. However, the effect of the salt contained in the black ink 1301 allows faster solid-liquid separation of the black ink on the surface of the recording medium than penetration of the coloring material in the black ink into the inside of the recording medium to operate fast separation and solidification of the coloring material. In addition, the pigment in the black ink 1301 contacts with the color ink 1305 on the surface of the recording medium 1303 and thus, causes unstabilization of the dispersion state in an aqueous solvent and following agglomeration and an agglomerate 1309 deposits on the surface of the recording medium finally resulting in suppression of penetration of the coloring material in the ink as shown in the FIG. 14F.

Where, the component unstabilizing the dispersion stability of the pigment is the polyvalent metal salt, for example, the bivalent metal salt, as the additive and the dye in the color ink penetrates into the inside of the recording medium and does not so contribute to improving image density. However, it can be said that the bivalent metal salt is generally smaller in a molecular weight than that of the dye and also that reaction efficiency is higher when the black ink contacts with the color ink to yield more agglomerates resulting in remaining around the surface of the recording medium. On the other hand, the pigment not involved in the reaction becomes a form overlaying on the agglomerate 1309 to contribute to improving image density.

Described above, an occupation ratio, which can be said as determine image density, of the coloring material on the surface of the recording medium and in a depth range from about 15 to 30 μm from the surface of the recording medium becomes very high to achieve the high image density.

Next, a case applying the color ink after the black ink is applied will be shown in the FIGS. 14A to 14C. When the black ink of low penetrability covers the recording medium as shown in the FIG. 14A, the black ink 1301 has low penetrability into the recording medium 1303 and penetrates in a low rate. And, thereafter, as shown in the FIG. 14B, when the color ink 1305 of high penetrability is applied, penetrability does not almost change because the surface of the recording medium is covered with the black ink 1301.

In such situation, the black ink 1301 and the color ink 1305 penetrate slowly into the recording medium 1303 and hence, as shown in the FIG. 14C, the coloring material of the black ink 1301 is easy to be left on the recording medium and shows the high optical density. In addition, the reaction of the black ink to the color ink leaves the agglomerate 1309 of the pigment of the black ink on the surface of a paper. By this, a printed matter of high optical density can be obtained. In the case where the mount of the color ink applied is excessive, both of the phenomena of fast solid-liquid separation and agglomeration of the black ink leaves a sufficient amount of the solid matter on the surface of a paper and appearance of evenness is in the good state.

Described above, in case applying the color ink after the black ink is applied, the dye of the color ink is overlaid on the agglomerate 1309. However, concentration of the coloring material in the ink for ink jet is not so high and therefore, if the concentration of the dye on the color ink, for example, is 10% by mass or lower to the mass of the color ink, it merely contribute to the image density at least visually. And, the agglomerate 1309 prominently improves the occupation ratio of the coloring material on the surface of the recording medium and in the range from about 15 to 30 μm from the surface of the recording medium and as the result, the high image density is formed.

And, according to the ink sets used herewith, regardless of the order of application of the black ink and the color ink, the image formed by both the method described above presents the image density almost equal and high at least visually. In addition, the coloring material in the ink is fixed as the agglomerate in the top of the recording medium and thus, even if the black ink and the color ink are overlaid on the recording medium, it can be suppressed to penetrate the pigment into the inside of the recording medium by the color ink having the high penetrability.

As the result, the occurrence of bleeding and white haze can be effectively relaxed. In addition, also in case forming the image of a monotonous gradation, the order of application of the ink need not be considered and more excellent expression of gradation can be easily realized.

Image formed by using black ink alone

Possible mechanisms will be given below for that the black ink according to the present invention provides the image density visually almost comparable with the image density yielded by overlaying the black ink and the color ink described above.

Figure 12A:
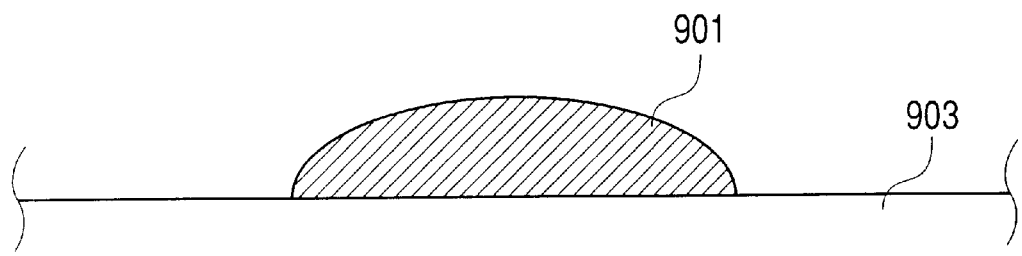
FIGS. 12A, 12B and 12C are diagrammatic views showing processes of solid-liquid separation, when a pigment ink containing a salt is applied to a recording medium.
Figure 12B:
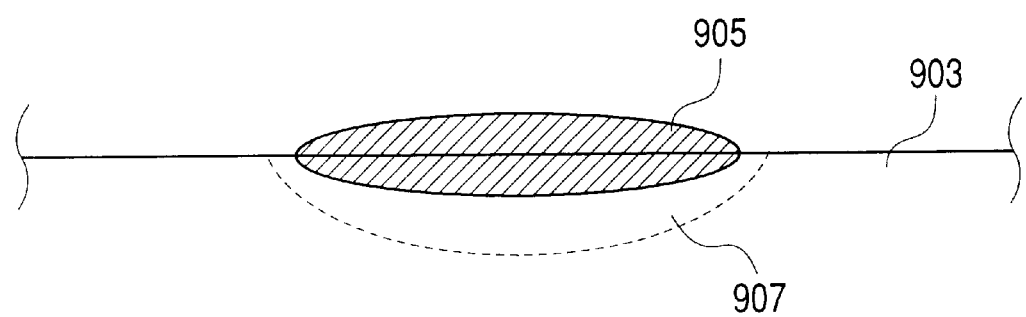
Figure 12C:
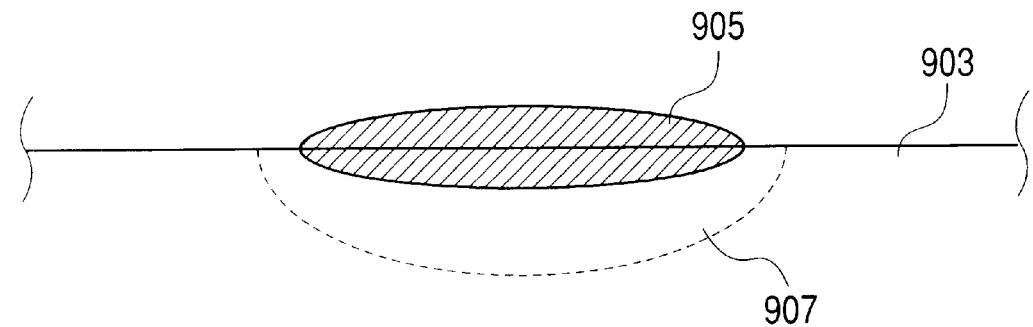
Figure 13A:
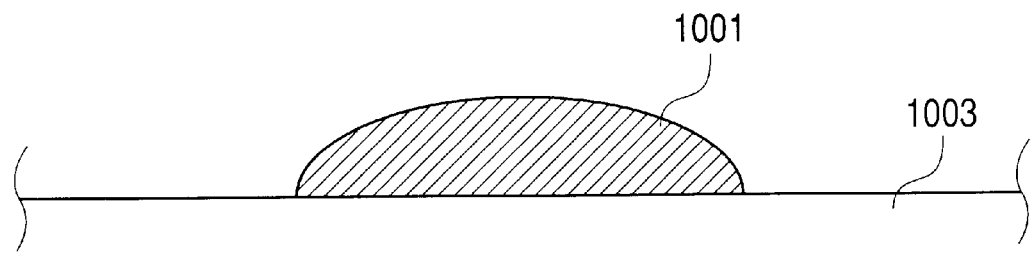
FIGS. 13A, 13B and 13C are diagrammatic views showing processes of solid-liquid separation, when a pigment ink containing no salt is applied to a recording medium.
Figure 13B:
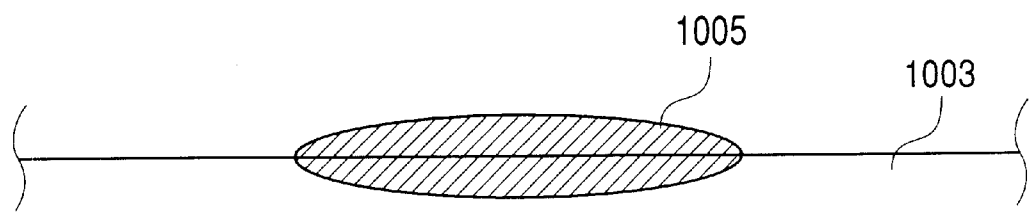
Figure 13C:
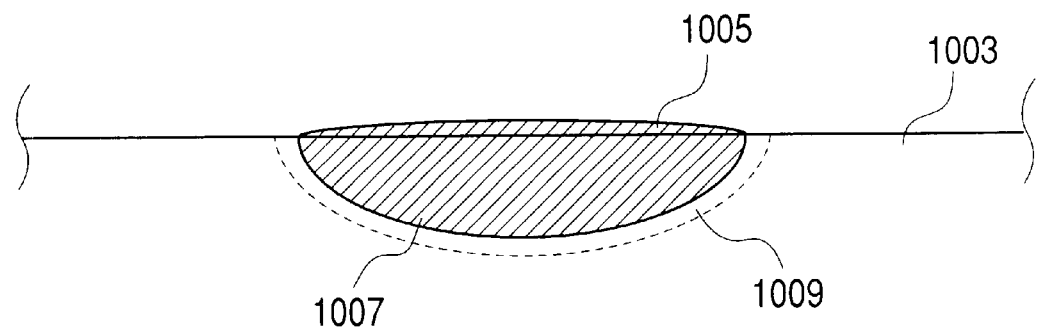

All of the FIGS. 12A to 12C and the FIGS. 13A to 13C are figures diagrammatically and conceptually showing aspects of solid-liquid separation caused when the ink, according to the present invention, containing the salt and the ink as a control group containing no salt are discharged from an orifice by the ink jet recording method to apply to the recording medium such as a normal paper of relatively high penetrability. Immediate after the ink attached to, concerning both the inks as shown in the FIG. 12A and the FIG. 13A, regardless of addition of the salt, the pigment ink 901 or 1001 has been placed on the surface of the paper (903 or 1003).

After a time T1 passed, in the pigment ink to which the salt is added, as shown in the FIG. 12B, solid-liquid separation occurs rapidly, a region 905 containing richly almost all the solid component of the ink is separated from the solvent in the ink, and finally a penetrating front 907 of the solvent separated goes to the inside of a solvent paper 903. On the other hand, as shown in the FIG. 13B, solid-liquid separation occurs not rapidly as that of the ink, to which the salt is added, and thus, in the state 1005 in which solid-liquid separation is not completed, the pigment ink containing no salt penetrates into the inside of the paper 1003.

After a time T2 passed, in the pigment ink to which the salt is added, as shown in the FIG. 12C, the penetrating front 907 of the solvent penetrates further into the inside of the paper and the region 905 is kept to stay on and around the surface of the paper. On the other hand, the pigment ink, to which the salt has not been added, as shown in the FIG. 13C, just begins solid-liquid separation at this point, the difference occurs between the penetrating front 1009 of the solid component of the ink and the penetrating front 1007 of the solvent and the region 1005 containing the solid component of the ink has reached a deep position of the recording medium.

The times T1 and T2 in the above described explanation are times as standards for understanding the difference of solid-liquid separation in presence and absence of the salt conceptually.

As evidently known from the description presented above, it can be said that addition of the salt causes rapidly solid-liquid separation and therefore, after attachment, together with solid-liquid separation in a relatively early stage, a solution penetrates into the inside of the recording medium and the coloring material (pigment) becomes easy to stay in the top of the recording medium and thus, the optical density increases. And, as described above, the black ink is generally set to a high surface tension in comparison with the color ink. In the state in which there is no overlay of the black ink on the color ink to increase in penetrability in the recording medium, the occupation ratio, which defines substantially the image density, of the coloring material is prominently improved on the surface of the recording medium and in the range of the depth from about 15 to 30 μm from the surface of the recording medium by fast solid-liquid separation of the black ink according to the present invention on the recording medium. As the result, a prominent improvement of density of the image formed by single use of the black ink is realized.

Figure 15:
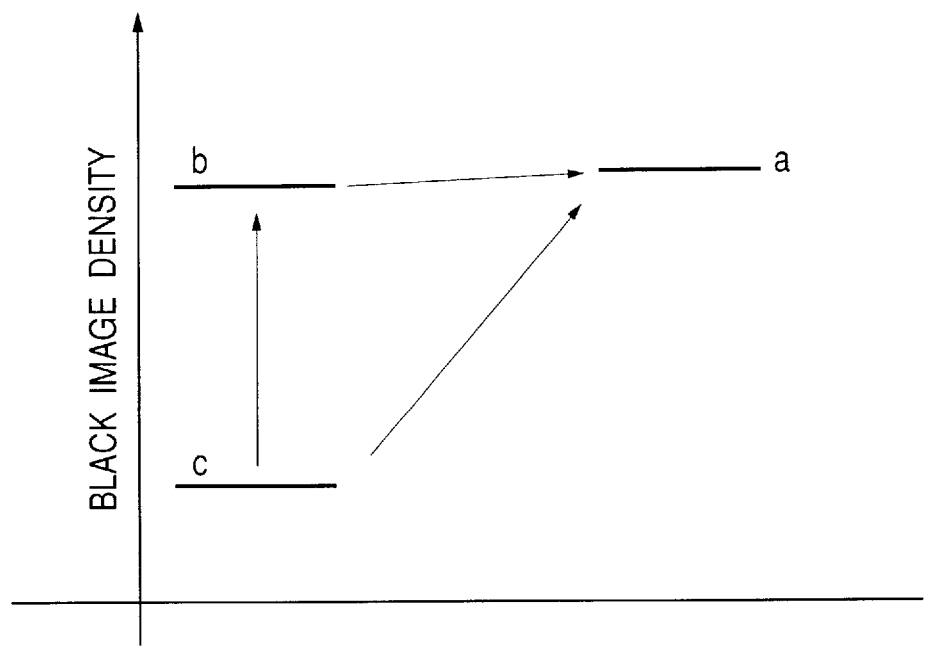
FIG. 15 is a graph of a relationship of the optical density in FIGS. 12C, 13C, 14C and 14F.

The FIG. 15 shows the density difference-reducing effect by using the ink set according to the present invention. In the FIG. 15, the black image density a is the density of the image formed by overlaying of the black ink and the color ink and b is the density of the image formed by single use of the black ink, which contains the salt, according to the present invention, and c is the density of the image formed by single use of the black ink, which contains no salt, used as the control group. As known from this figure, the difference between the black image density a and c is largely reduced by using such ink set according to the present invention and the difference between the image density a and b in visual observation can be made to almost unrecognizable degree.

The black ink and the color ink constituting the ink set according to the present invention will be described below in detail.

With respect to black ink

As the coloring material in the black ink, carbon black is, for example, used preferably. And, as a form of dispersion of carbon black in the ink may be self-dispersing type or the form of dispersion by a dispersant.

Self-dispersing type carbon black

Self-dispersing type carbon black is, for example, exemplified by carbon black in which at least one hydrophilic group (anionic group and cationic group) as the ionic group is bound to the surface of carbon black directly or through other atom group. Using this allows reducing addition of or makes unnecessary the additive for dispersing carbon black.

In the case of carbon black on which surface is bound to the anionic group directly or through other atom group, the hydrophilic group bound to the surface can be exemplified by, for example, —COO(M2), —SO$_3$(M2), —PO$_3$H(M2), —PO$_3$H(M2)$_2$, and the like. Where, in the above described formulae, "M2" represents a hydrogen atom, an alkali metal, an ammonium, or an organic ammonium. Among these, particularly, self-dispersing type carbon black, in which —COO(M2) or —SO$_3$(M2) is bound to the surface of carbon black to electrify it anionically, is good in dispersibility in the ink and therefore, can be particularly preferably used in the present implementation.

Meanwhile, among hydrophilic groups, specific examples of the alkali metal among those expressed as "M2" are exemplified by, for example, Li, Na, K, Pb, and Cs and the like and specific examples of the organic ammonium are, for example, exemplified by methyl ammonium, dimethyl ammonium, trimethyl ammonium, ethyl ammonium, diethyl ammonium, triethyl ammonium, methanol ammonium, dimethanol ammonium, trimethanol ammonium, and the like.

The ink, according to the present implementation, containing self-dispersing type carbon black, in which M2 is the ammonium or the organic ammonium, can improve further waterproof performance of a recorded image and in this point, can be used particularly preferably. This may be because the effect when the ink is applied to the recording medium, the ammonium is decomposed and the ammonium is evaporated. Where, as methods for manufacturing self-dispersing type carbon black, in which M2 is the ammonium, for example, the method in which in self-dispersing type carbon black in which M2 is the alkali metal, the M2 is substituted to the ammonium by applying ion exchange method and the method in which the M2 is changed to the ammonium by adding ammonium hydroxide after it is changed to H type by adding an acid are exemplified.

The method for manufacturing self-dispersing type carbon black anionically electrified is exemplified by, for example, the method in which carbon black is subjected to oxidization treatment with sodium hypochlorite and this method allows binding —COONa group chemically to the surface of carbon black.

Carbon black cationically electrified is exemplified by, for example, that in which the hydrophilic group is bound directly or through other atom group is bound to at least one selected from, for example, quatery ammonium groups shown in the following description.

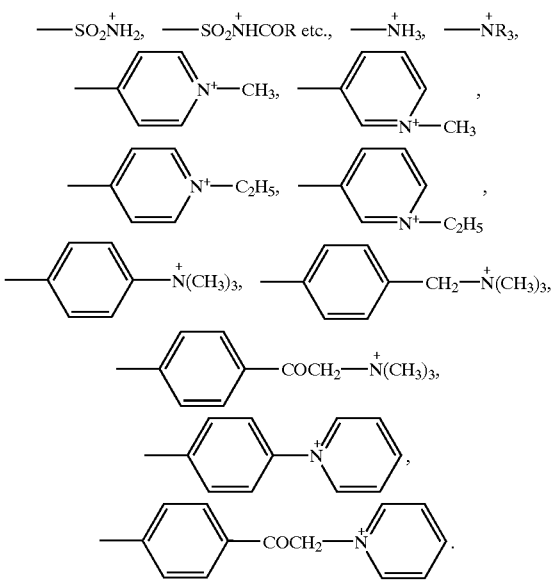

In the formulae described above, R represents a linear or branched linear alkyl group having carbon number ranging 1 to 12, a phenyl group which may have a substituted group, or a naphthyl group which may have a substituted group.

The cationic groups described above have NO$_3$⁻ and CH$_3$COO⁻, for example, as a counterion.

As the method for manufacturing self-dispersing type carbon black cationically electrified by binding the hydrophilic group described above is exemplified by the method, the method, in which N-ethylpyridyl group having the following structure is bound, is exemplified by the method in which carbon black is treated with 3-amino-N-ethylpyridinium bromide.

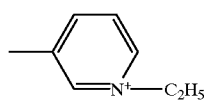

Described above, carbon black cationically or anionically electrified by introducing the hydrophilic group to the surface of carbon black has excellent dispersibility in water by repellency of ions and therefore, in case containing it in the water-base ink, a stable dispersion state is kept without addition of the additive and the like.

Meanwhile, various hydrophilic groups described above may be directly bound to the surface of carbon black. Or, other atom group may be interposed between the surface of carbon black and the hydrophilic group to bind indirectly the hydrophilic group to the surface of carbon black. Where, the other atom group is specifically exemplified by a linear or branched linear alkylene group having carbon number ranging 1 to 12, a phenylene group substituted or nonsubstituted, and a naphthylene group substituted or nonsubstituted. Where, a substituent of the phenylene group and the naphthylene group is, for example, exemplified by the linear or branched linear alkyl group having carbon number ranging 1 to 6. On the other hand, a combination of another atom group with the hydrophilic group is, for example, exemplified by —$C_2H_4$COO(M2), —Ph—$SO_3$(M2), —Ph—COO (M2), and the like (where, Ph represents phenyl group).

Meanwhile, two or more species of self-dispersible carbon black described above in the present implementation may be used as the coloring material of the ink properly selected. On the other hand, it is preferable that the amount of self-dispersible carbon black to be added to the ink ranges from 0.1 to 15% by weight, particularly from 1 to 10% by weight to the total mass of the ink. Preparation in this range allows keeping an enough dispersion state of self-dispersible carbon black in the ink. In order to aim adjustment of color tone of the ink, the dye may be further added as the coloring material in addition to self-dispersible carbon black.

Normal carbon black

As the coloring material for carbon black, normal carbon black not self-dispersible can be used.

Such carbon black is, for example, exemplified by carbon black pigments such as furnace black, lamp black, acetylene black, channel black, and the like. The following specific examples usable are, for example, exemplified by Raven 7000, Raven 5750, Raven 5250, Raven 5000 Ultra-, Raven 3500, Raven 2000, Raven 1500, Raven 1250, Raven 1200, Raven 1190 Ultra-II, Raven 1170, and Raven 1255 (these are made by Colombia Corp.), Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, Valcan XC-72R (Cabot Corp. made), Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (Degussa Corp. made), No. 25, No. 33, No. 40, No. 47, No. 52, No. 900, No. 2300, MCF-88, MA600, MA7, MA8, and MA100 (Mitsubishi Chemical Corporation made); however, it is not restricted to these, but carbon black conventionally and publicly known can be used.

In addition, a magnetic fine particle such as magnetite, ferrite, and the like and titanium black and the like may be used as the black pigment.

In case using such normal type carbon black as the coloring material of the black ink, it is preferable to add the dispersant to the ink in order to disperse stably in the aqueous medium.

As the dispersant, those, for example, having the ionic group and capable of dispersing carbon black stably in the aqueous medium by an action thereof is preferably used and as such dispersant, the following dispersant are, for example, specifically exemplified: styrene-acrylic acid copolymer, styrene-acrylic acid-alkyl acrylate ester copolymer, styrene-maleic acid copolymer, styrene-maleic acid-alkyl acrylate ester copolymer, styrene-methacrylic acid copolymer, styrene-methacrylic acid-alkyl acrylate ester copolymer, styrene-maleate half ester copolymer, vinyl naphthalene-acrylatic acid copolymer, vinyl naphthalene-maleic acid copolymer, styrene-maleate anhydride-maleate half ester copolymer, or salts of these compounds. Among these compounds, those having a mass average molecular weight ranging from 1,000 to 30,000 are preferable; a particularly preferable range is from 3,000 to 15,000.

Salts contained in black ink

As salts that may be had by the black ink according to the present invention, it is preferable that at least one selected from $(M1)_2SO_4$, $CH_3COO(M1)$, Ph—COO(M1), $(M1)NO_3$, (M1)Cl, (M1)Br, (M1)I, $(M1)_2SO_3$, and $(M1)_2CO_3$ is used. Where, M1 represents an alkali metal, ammonium, or organic ammonium. Ph represents phenyl group.

And, specific examples of the alkali metal are exemplified by Li, Na, K, Pb, Cs, and the like and specific examples of the organic ammonium are, for example, exemplified by methyl ammonium, dimethyl ammonium, trimethyl ammonium, ethyl ammonium, diethyl ammonium, triethyl ammonium, methanol ammonium, dimethanol ammonium, trimethanol ammonium, ethanol ammonium, diethanol ammonium, triethanol ammonium, and the like.

And, among salts described above, sulfate salts (for example, potassium sulfate and the like), and benzoic acid salts (for example, ammonium benzoate) are excellently match self-dispersible carbon black and specifically, particularly excellent in solid-liquid separation effect when applied to the recording medium and therefore, can form the ink jet-recorded image of particularly excellent quality on various recording media.

Coexistence of salts, as described above, in the ink containing the coloring material dispersed in the aqueous medium by the action of the ionic group, for example, the ink containing self-dispersible carbon black, allows preventing a large change of the image quality according to a kind of the recording medium and yielding the ink stably capable of formation of the high quality image.

Detailed mechanisms, by which the black ink according to the present invention expresses characteristics described above, has not been known at this time. However, regarding the Ka value measured by the Bristow method known as the measure expressing penetrability of the ink into the recording medium, the inventors have obtained a finding that the black ink according to the present invention shows a large Ka value in comparison with the ink having the same composition except for no addition of the salt.

Increase in the Ka value shows penetrability, which has been improved, of ink into the recording medium. As common sense of those skilled in the art so far, improvement of ink penetrability means decrease in optical density. In other words, it is an interpretation of those skilled in the art that together with penetration of the ink, the coloring material also penetrates into the inside of the recording medium and as the result, optical density decreases.

And, according to a general interpretation on the basis of various findings about the black ink according to the present invention, it can be said that the salt in the black ink causes a specific action as very rapid separation (solid-liquid separation) of the solvent from the solid component in the ink after applied to the surface of the paper. In other words, slow solid-liquid separation when the ink is applied to the recording medium disperses the ink having a large Ka value or the ink on the paper showing large ink penetrability in the paper isotropically together with the coloring material and as the result, sharpness of a character (quality of the character) is damaged and also the coloring material penetrates into a back of the paper presumably to decrease optical density.

On the contrary, the black ink according to the present invention presents no observation of such phenomenon and hence, it is guessed that solid-liquid separation occurs soon when the ink is applied to the recording medium and as the result, regardless of increase in the Ka value of the ink, the high quality image is yielded. In addition, this can be the same reason why even in the paper having relatively high penetrability, the black ink according to the present invention causes seldom phenomena such as lowering of quality of the character and decrease in optical density.

It is preferable that content of the coloring material, in the black ink according to the present invention, for example, self-dispersible carbon black ranges from 0.1 to 15% by weight and particularly, from 1 to 10% by weight to the total mass of the ink. On the other hand, the content of salts ranges preferably from 0.05 to 10% by weight and particularly, from 0.1 to 5% by weight to the total mass of the ink. Defining the content of the coloring material and salts in the black ink to the range described above allows providing the more excellent effect.

When self-dispersible carbon black described above is used as the coloring material, in case using, for example, —COO(M2), —SO$_3$(M2)$_2$, —PO$_3$H(M2), —PO$_3$(M2)$_2$, and the like, as the hydrophilic group on the surface of carbon black, it has been described that the ammonium and the organic ammonium can be used preferably as the M2. In this occasion, matching, for example, the M2 namely, making M1=M2 for the salt in the black ink is one of preferable aspects.

Consequently, the inventors, in the course of examination of the effect of adding the salt to the ink containing self-dispersible carbon black, made a finding that when the M2 (counter ion) and the M1 of the hydrophilic group of self-dispersible carbon black are identical, ink stability is particularly increased. Why using the identical M1 and M$_2$ results in such effect has not been explained. However, it is guessed that in the ink, no salt exchange occurs between a counter ion of the hydrophilic group of self-dispersible carbon black and the salt and therefore, dispersion stability of self-dispersible carbon black is stably kept.

And, in the case where both of the M1 and the M$_2$ are assumed to the ammonium and the organic ammonium, in addition to effect stabilizing ink characteristics, water fastness performance of the recorded image can be further improved. Further, in this occasion, using Ph—COO(NH$_4$) (ammonium benzoate) as the salt in the ink allows yielding a very excellent result also in redischarge performance of the ink from a head nozzle after ink jet recording is temporarily stopped.

Aqueous medium in black ink

Examples of the aqueous medium used in the black ink according to the present invention are exemplified by water or a mixture solvent of water with a water-soluble organic solvent. As the water-soluble organic solvent, those having the effect to prevent drying of the ink is particularly preferable.

Specifically, for example, the followings are exemplified: alkyl alcohols having a carbon number of 1 to 4, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones or ketoalcohols such as acetone and diacetonalcol; others such as tetrahydrofuran and dioxane; polyalkyleneglycols such as polyethylene glycol and polypropylene glycol; alkylene glycols having alkylene group having 2 to 6 carbon atoms, such as ethylene glycol, propylene glycol, butylene glycol, triethylene glycol, 1,2,6-hexane triol, thiodiglycol, hexylene glycol and diethylene glycol; lower alkyl ether acetate such as polyethylene glycol monomethyl ether acetate; glycerin; lower alkyl ethers of a polyvalent alcohol such as ethylene glycol monomethyl (or ethyl) ether, diethylene glycol methyl (or ethyl) ether, and triethylene glycol monomethyl (or ethyl) ether; polyvalent alcohols such as trimethylol propane and trimethylol ethane; N-methyl-2-pyrrolidon, 2-pyrrolidon, 1,3-dimethyl-2-imidazolidinon. The water-soluble organic solvent described above can be used independently or as the mixture. As water, use of deionized water is preferable.

The content of the water-soluble organic solvent contained in the black ink according to the present invention is not specially restricted: however, ranges preferably from 3 to 50% by mass to the total mass of the ink and the content of water contained in the ink ranges preferably from 50 to 95% by mass to the total mass of the ink.

The black ink so far described expresses the excellent effect to allow very reducing dependency of the printing quality on characteristics of the recording medium. And, the black ink according to the present invention also has an excellent point other than this.

Figure 16:
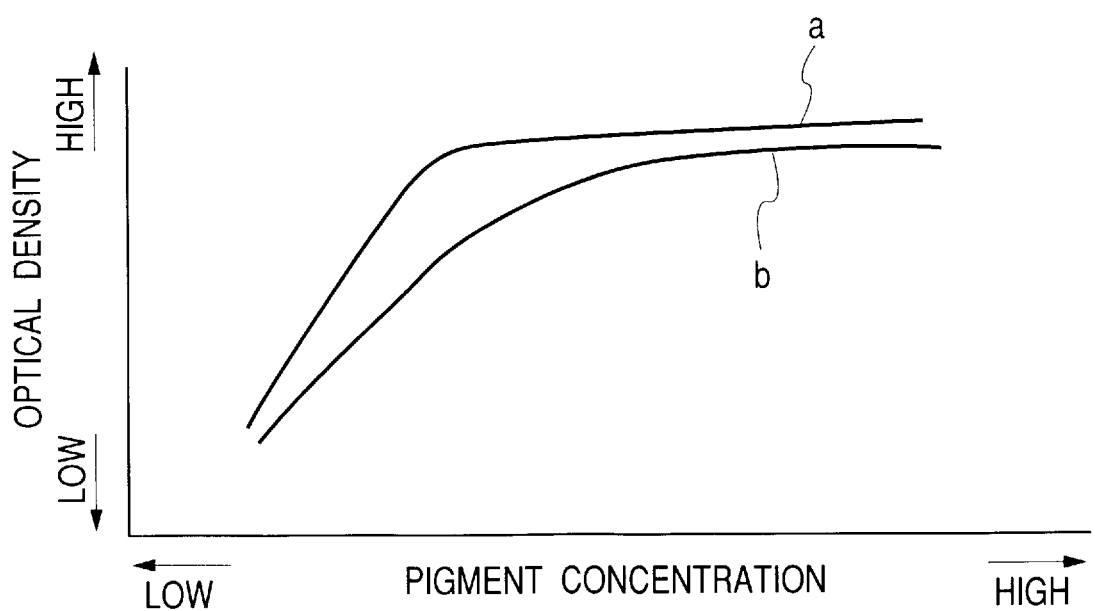
FIG. 16 is a graph showing presence and absence of the salt in the ink and the relationship the density of the pigment in the ink with the optical density.

Concerning the black ink and the black ink of the same composition except for no content of the salt as the control group, the FIG. 16 presents the graph of plot of a relation of the pigment concentration to the optical density of the image formed by each ink. As known from the FIG. 16, the optical density of the image formed by all ink finally reaches a similar value. However, the following finding has been obtained: the black ink (a) according to the present invention reaches a saturated value in a lower pigment concentration than the black ink (b) as the control. Adding the salt makes reduction of pigment concentration in the ink possible without change of the optical density of the image.

Specifically, for example, when about 1% by mass ammonium benzoate as the salt is contained, if concentration of self-dispersible carbon black is about 4% by mass, optical density of a print on the normal paper reaches, for example, about 1.4 and further increase in carbon black does not so change optical density. In contrast to this, in using the ink containing no salt, in case making carbon black concentration to 4% by mass, optical density of the print on the normal paper is about 1.32, in case making carbon black concentration to 7% by mass, optical density is about 1.35, and in case making carbon black concentration to 8% by mass, optical density is about 1.35; this value is an approximate saturation value.

The difference in such saturation value (1.4 and 1.35) of optical density is very small 0.05 as a numerical figure. However, when various printed documents are compared, the difference can be visually obviously recognized. Described above, the ink containing the salt can, in comparison with the ink containing no salt, carry out printing in high optical density even in a low carbon black concentration and brings a preferable result in that the saturation value itself of optical density is high. For reference, hereby, the specific example using self-dispersible carbon black has been described. The same event was observed for the black ink in which carbon black is dispersed by using a dispersant.

This fact brings the following advantage. The ink containing the salt, as described above, has a characteristic of a wide margin of carbon black concentration in comparison with optical density of the printed document. Therefore, for example, this ink is filled in an ink tank having an absorber and after the ink tank is left standing for a long time (for example, 6 months, left standing keeping the nozzle upward) in a same attitude, when printing is carried out by using the ink tank, occurrence of the difference of visually recognizable optical density between the printed document yielded in an early stage of printing and the printed document yielded immediate before exhaust of the ink in the ink tank can be very effectively prevented.

The ink described above can be pointed out an excellent intermittent discharge performance as another further effect of adding the salt. Intermittent discharge performance is that to evaluate the ink discharge is normal or not from an initial stage of redischarge, when the predetermined nozzle of the recording head is taken into account, the ink is discharged from the nozzle, thereafter, the nozzle is left standing for a predetermined time without carrying out preliminary discharge of the ink and sucking of the ink in the nozzle, and the ink is discharged again from the nozzle.

Characteristics of ink: ink jet discharging characteristics and penetrability into recording medium The black ink according to the present invention can be used as the ink as a writing instrument and the ink for ink jet recording. As the method for ink jet recording, there are the recording method in which dynamic energy is worked on the ink to discharge the ink droplet and the recording method in which thermal energy is applied to the ink to discharge the ink droplet by bubbling of the ink. For these recording methods, the ink according to the present invention is particularly preferable.

By the way, in case of using the black ink according to the present invention for ink jet recording, it is preferable that the ink has a characteristic of dischargeablility from the ink jet head. From the viewpoint of dischargeablility from the ink jet head, preferably, characteristics of the ink are, for example, a viscosity thereof ranging from 1 to 15 mPa.s and a surface tension thereof of 25 mN/m or more and particularly, the viscosity thereof ranging from 1 to 5 mPa.s and the surface tension thereof ranging from 25 to 50 mN/m.

Ka value measured by the Bristow method is a measurement expressing the penetrability of the ink into the recording medium. If it is assumed that penetrability of the ink is expressed by an ink amount V per 1 m$^2$, a penetration amount V (mL/m$^2$=$\mu$m) of the ink into the recording medium after a predetermined time t passed after the ink droplet is discharged is expressed by the following Bristow's formula:

$$V = Vr + Ka\,(t-tw)^{1/2}$$

wherein, immediately after the ink droplet attached to the surface of the recording medium, a large part of the ink is absorbed by a concave-convex part of a surface (a roughe part of the surface of the recording medium) of the recording medium and not almost penetrated into the inside of the recording medium. The time during that is a contact time (tw) and the ink amount absorbed by the concave-convex part of the recording medium in the contact time is represented by Vr.

After the ink attached, when the contact time passed, penetration into the recording medium increases for the time over the contact time, namely, that proportioned to $(t-tw)^{1/2}$. The Ka is a factor of proportionality of this increase and shows a value in accordance with a penetration rate. And, the Ka value can be measured by employing an apparatus (for example, commercial name: dynamic penetration testing apparatus S; Toyo Seiki Seisaku-Sho, Ltd. made) for testing dynamic penetration of the ink, based on the Bristow method.

And, in the ink according to individual implementations of the present invention described above, setting this Ka value less than 1.5 is preferable to improve further quality of the recorded image and further preferably, it is 0.2 or more and less than 1.5. In other words, it can be said that when the Ka value is less than 1.5, solid-liguid separation occurs in an early stage of a penetration process of the ink into the recording medium to make possible formation of the high quality image showing least feathering.

The Ka value according to the Bristow method in the present invention is the value measured by using the normal paper (for example, a PB paper used for a copying machine using electrophotographic system, a page printer (a laser beam printer), and a printer, which uses the ink jet recording system, which are made by Canon Inc.), and a PPC paper, which is the paper for the copying machine using electrophotographic system, and the like as the recording medium. As an environment for measurement an ordinary office environment, for example, a temperature ranging from 20 to 25° C. and a humidity ranging from 40 to 60%, is in consideration.

And, as the composition of a preferable aqueous medium to have characteristics described above, for example, it is preferable to make one containing glycerin, trimethylol propane, thiodiglycol, ethylene glycol, diethylene glycol, isopropyl alcohol, and acetylene alcohol.

With respect to color ink
Coloring material

The coloring material used for the present invention is not specially restricted, but those preferable are dyes of xanthene-based, triphenyl methane-based, anthraquinone-based, monoazo-based, disazo-based, trisazo-based, tetraazo-based, and copper phthalocyanine-based, which are water soluble and have been described in the Color Index. The ink can be prepared by combining one species or two species of these coloring materials to be contained in the same ink. The content of coloring materials in the ink ranges preferably, as a rule, from 0.1 to 15.0% by weight and more preferably, ranges from 0.5 to 5.0% by weight to the total ink.

Specific examples of anionic dyes are exemplified by the followings

Coloring materials for yellow
C. I. direct yellow 8, 11, 12, 27, 28, 33, 39, 44, 50, 58, 85, 86, 87, 88, 89, 98, 100, 110, 132
C. I. acid yellow 1, 3, 7, 11, 17, 23, 25, 29, 36, 38, 40, 42, 44, 76, 98, 99
C. I. reactive yellow 2, 3, 17, 25, 37, 42
C. I. food yellow 3
Coloring materials for red
C. I. direct red 2, 4, 9, 11, 20, 23, 24, 31, 39, 46, 62, 75, 79, 80, 83, 89, 95, 197, 201, 218, 220, 224, 225, 226, 227, 228, 229, 230
C. I. acid red 6, 8, 9, 13, 14, 18, 26, 27, 32, 35, 42, 51, 52, 80, 83, 87, 89, 92, 106, 114, 115, 133, 134, 145, 158, 198, 249, 265, 289
C. I. reactive red 7, 12, 13, 15, 17, 20, 23, 24, 31, 42, 45, 46, 59
C. I. food red 87, 92, 94
Coloring materials for blue
C. I. direct blue 1, 15, 22, 25, 41, 76, 77, 80, 86, 90, 98, 106, 108, 120, 158, 163, 168, 199, 226
C. I. acid blue 1, 7, 9, 15, 22, 23, 25, 29, 40, 43, 59, 62, 74, 78, 80, 90, 100, 102, 104, 117, 127, 138, 158, 161
C. I. reactive blue 4, 5, 7, 13, 14, 15, 18, 19, 21, 26, 27, 29, 32, 38, 40, 44, 100
Coloring materials for black
C. I. direct black 17, 19, 22, 31, 32, 51, 62, 71, 74, 112, 113, 154, 168, 195
C. I. acid black 2, 48, 51, 52, 110, 115, 156
C. I. food black 1, 2

In recent years, an ink jet image of high quality comparable to a silver salt photograph has been realized. Therefore, not only good image quality, but also longer conservability of the image recorded is required.

Regarding the requirement described above, using the ink set of which light light property ΔE of each color ink for formation of the color image is almost equal allows, without break of a color balance of the image, preventing deterioration of the image after the long time conservation.

Hereby, the color of the ink can, for example, be expressed by using a color space like CIELAB. In the CIELAB color space, the color is expressed by using 3 terms: L*, a*, and b*. L* is defines brightness of the color and ranges from 0 (black) to 100 (white). a* and b* defines hues and chromaticity of the color.

The ΔE defines the difference between 2 colors and the ΔE increased makes the difference between 2 colors larger and expressed as:

$$\Delta E = [(L^*_1 - L^*_2)^2 + (a^*_1 - a^*_2)^2 + (b^*_1 - b^*_2)^2]^{1/2} \quad \text{(Equation 1)}$$

$$\text{and } \Delta E = (\Delta L^{*2} + \Delta a^{*2} + \Delta b^{*2})^{1/2} \quad \text{(Equation 2)}$$

Use of this ΔE allows knowing light resistance (light fastness) of the color ink. When the ΔE immediately after printing between after light fading is large, light light property is large. When the ΔE is equal among individual colors, total light fading of the image can be somewhat recognized, but the color balance is kept and thus, deterioration of image quality is seemingly small. In addition, remaining ratio of reflection strength of individual colors is large; total light fading of the image can be difficulty recognized.

In addition, it is preferable the ink is adapted to that light light property after simulated indoor fading for three or more years falls in 10 of the difference of the ΔE in a CIELAB color space indication system.

Consequently, in the case where a dark and light magenta inks are contained in the ink sets according to the present invention, for these dark and light magenta inks, at least coloring materials expressed by the following general formula (I) is preferably used.

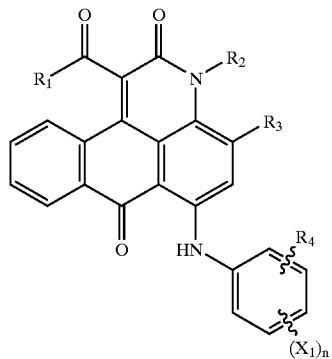

General formula (I)

(In the general formula (I) described above, $R_1$ represents a substituted or non-substituted alkoxy group or a substituted or non-substituted aryl group, $R_2$ and $R_4$ individually independently represent a hydrogen atom or a substituted or non-substituted alkyl group, and $R_3$ represents hydrogen atom, a substituted or non-substituted alkyl group, a substituted or non-substituted alkoxy group, a substituted or non-substituted aryloxy group, or a halogen atom. $X_1$ represents carboxyl group or a salt thereof or a sulfonic acid or the salt thereof. n represents an integer of 1 to 2.)

The specific example of the coloring material expressed by the general formula (I) is presented below; however, it is not restricted to these. Further, two or more species of these coloring materials may be used together in the same ink.

The specific example of the coloring material contained in the compound of the general formula (I) used in the present invention has the following structure.

Compound Example 1

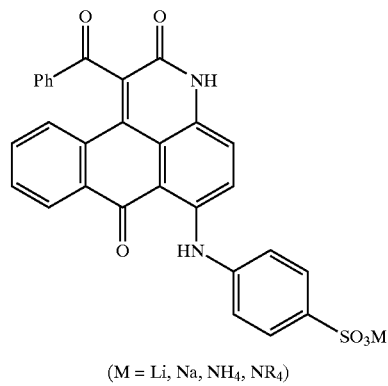

(M = Li, Na, NH$_4$, NR$_4$)

Compound Example 2

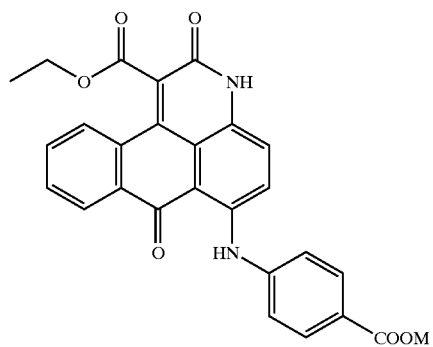

Compound Example 3

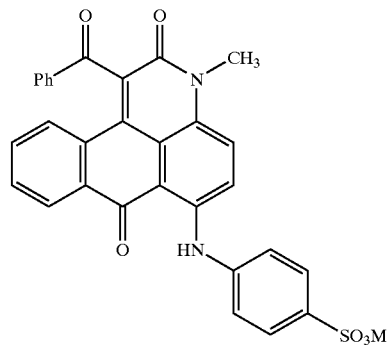

Compound Example 4

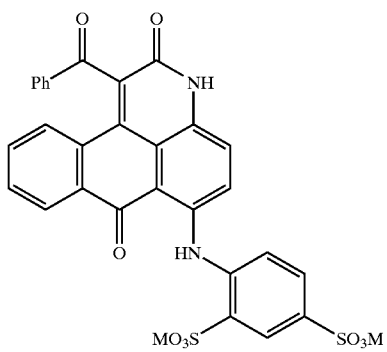

Compound Example 7

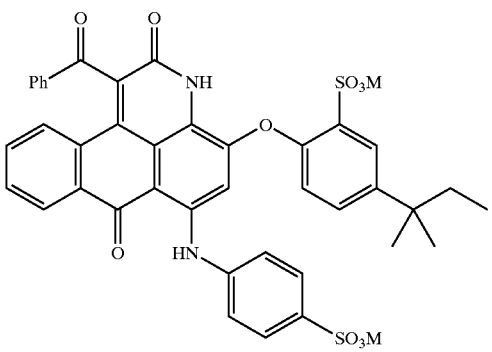

Compound Example 5

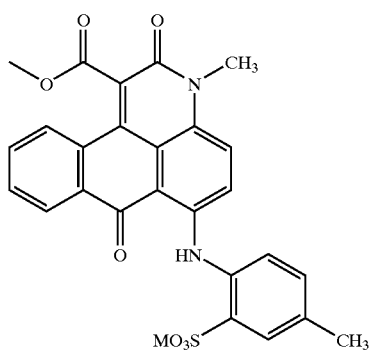

More preferable coloring material of the dark magenta ink is that containing at least one species of the coloring material expressed by the general formula (I) and at least one species of the coloring material expressed by the following general formula (II) and the following general formula (III) and the coloring material having a xanthene structure.

General formula (II)

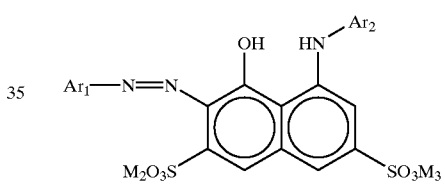

Compound Example 6

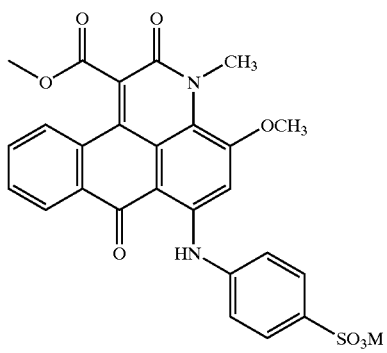

(In the general formula (II) described above, $Ar_1$ represents an aryl group having at least one substituent selected from carboxyl group, a salt thereof, sulfonic acid and a salt thereof, or a substituted or non-substituted alkyl group and $Ar_2$ represents any one of acetyl group, benzoyl group, a 1,3,5-triazine derivative, $SO_2$—$C_6H_5$ group, or $SO_2$—$C_6H_4$—$CH_3$ group. $M_2$ and $M_3$ are counterions and represent a alkali metal, ammonium, and organic ammonium.

General formula (III)

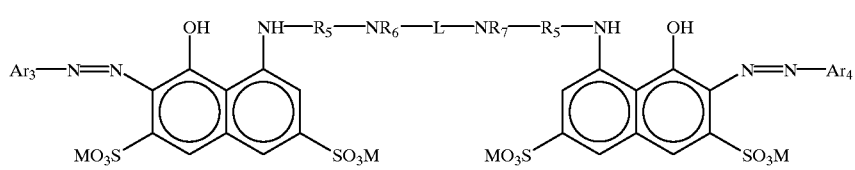

(Ar₃ and Ar₄ represent individually independently aryl group or a substituted aryl group and at least one of Ar₃ and Ar₄ has a substituent of the carboxyl group, a salt thereof, sulfonic acid or a salt therof. M is a counterion and represents an alkali metal, ammonium, and organic ammonium. $R_5$ represents 1,3,5-triazine or a 1,3,5-triazine derivative. $R_6$ and $R_7$ independently represent hydrogen atom, alkyl group, a substituted alkyl group, the alkenyl group, a substituted alkenyl group, aralkyl group, or a substituted aralkyl group, or a group of atoms together with N necessary for formation of perhydroxyazine ring and L represents a divalent organic liked group).

The coloring material of the compound of the general formula (II) used in the present invention is, for example, exemplified by C. I. Reactive Red 189 and one having the following structure and further, the compounds with the structure described in Japanese Patent Application Laid-Open No. 8-73791, Japanese Patent Application Laid-Open No. 11-209673.

Compound Example 8

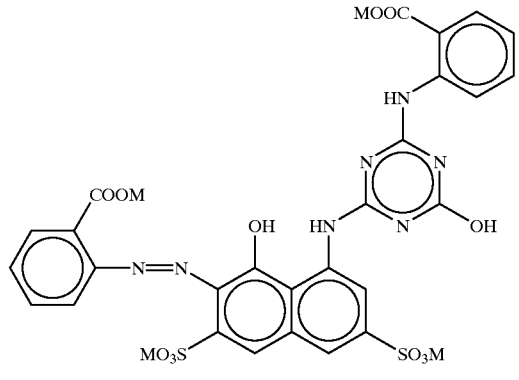

(M = Li, Na, NH4, NR4)

Compound Example 9

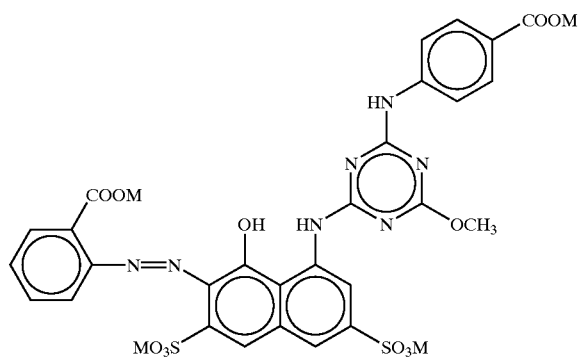

Compound Example 10

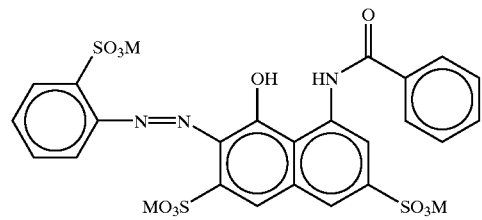

Compound Example 11

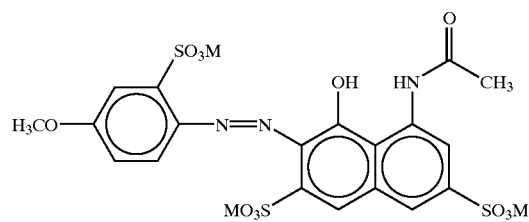

Compound Example 12

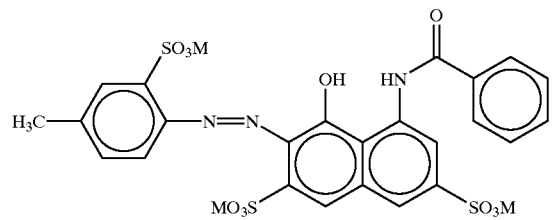

Compound Example 13

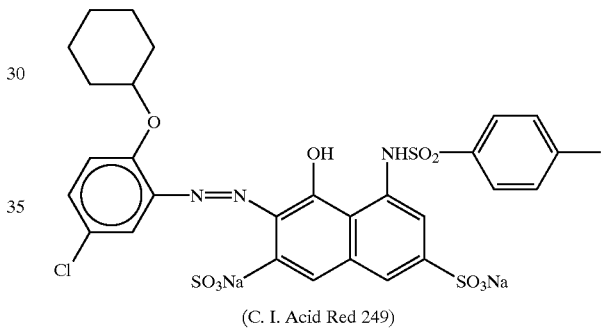

(C. I. Acid Red 249)

The coloring material of the compound of the general formula (III) used in the present invention has the following structure.

Compound Example 14

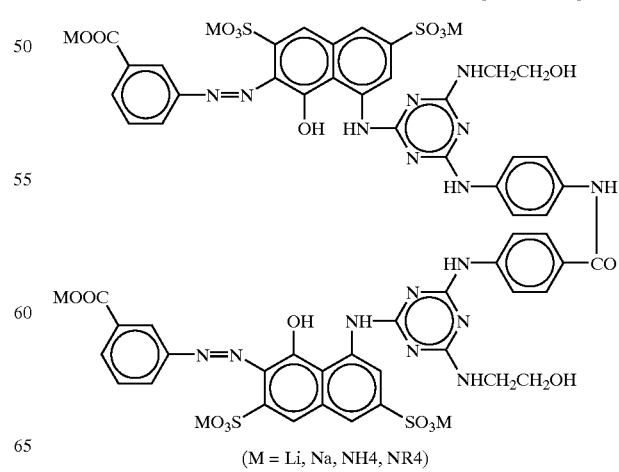

(M = Li, Na, NH4, NR4)

-continued
Compound Example 15
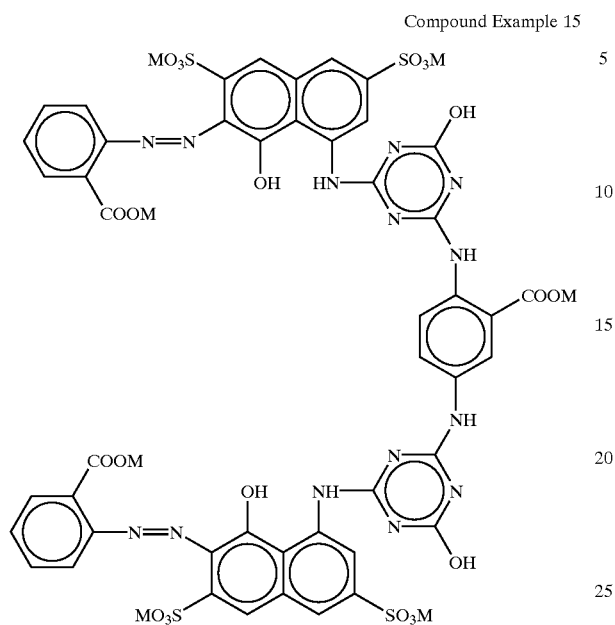
Compound Example 16
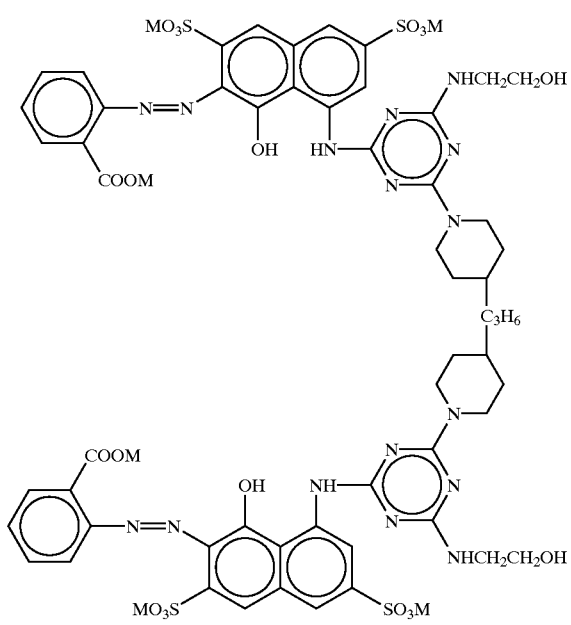
-continued
Compound Example 17
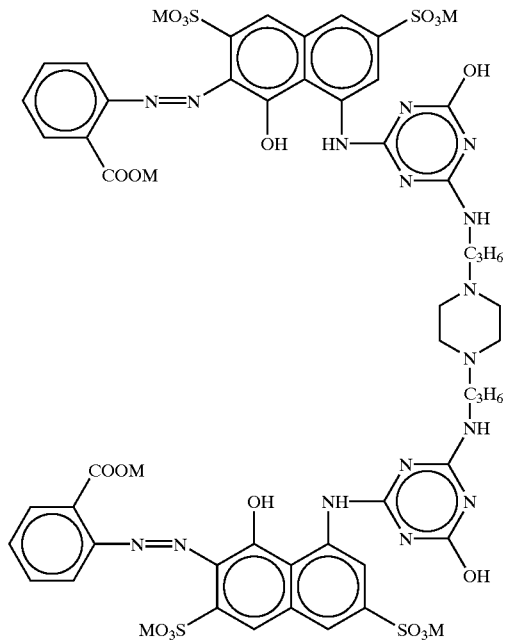
Compound Example 18
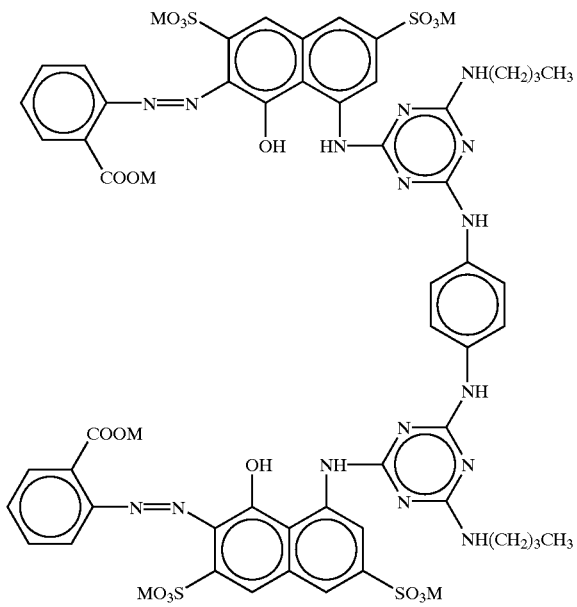

Compound Example 19

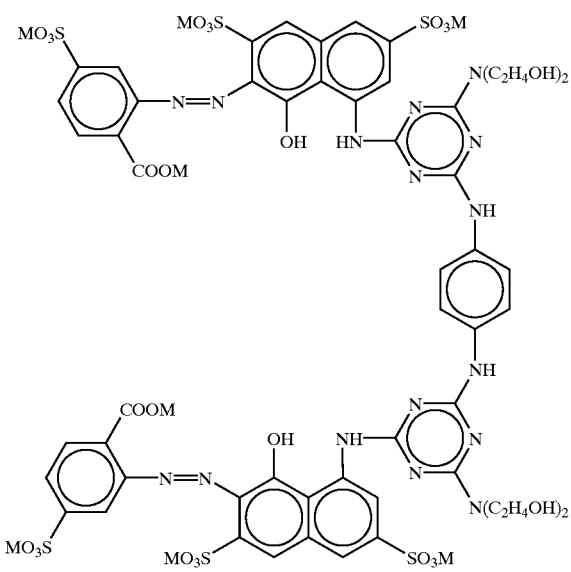

Compound Example 20

Compound Example 21

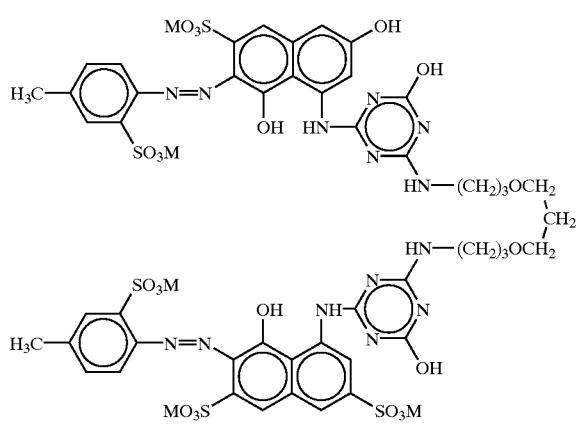

Compound Example 22

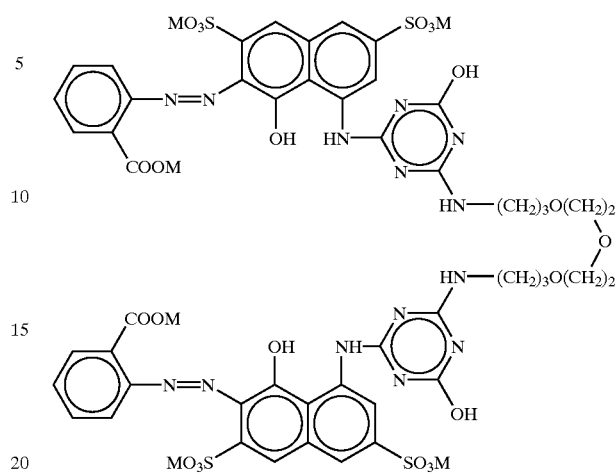

The specific examples of the coloring material having the xanthene structure are exemplified by C. I. Acid Red 52, 92, 94, 289, and the like.

In the dark magenta ink according to the present implementation, a weight ratio of the coloring material expressed by the general formula (I) to the coloring material (at least any one species of the coloring material expressed by the general formula (II) and the general formula (III) and the coloring material having the xanthene structure) other than that expressed by the general formula (I), in consideration of the effect providing a sharp color tone, high image density, and excellent light resistance, ranges preferably from 95:5 to 20:80. When the weight ratio of the compound of the general formula (I) becomes further larger, some recording medium does not occasionally provide clear tone and image density and also when the weight ratio becomes further smaller, enough light resistance may not be yielded.

In case containing dark and light cyan inks in the ink set according to the present invention, it is more preferable to use the copper phthalocyanine dye as the coloring material of these inks. Specific examples of the coloring material having the copper phthalocyanine structure are exemplified by C. I. Acid Blue 249, C. I. Direct Blue 86, C. I. Direct Blue 199, C. I. Direct Blue 307, and the like. Other than these the copper phthalocyanine dyes, other cyanic coloring material may be used in combination. However, in a combined use, the weight ratio of the copper phthalocyanine dye to other dye more preferably ranges from 95:5 to 20:80.

In case containing the yellow ink in the ink set according to the present invention, it is more preferable to use Direct Yellow 132 as the coloring material.

In the ink set according to the present invention, the black ink may be further contained and in this case, similarly to other color inks, the ink is preferably prepared to show light light property after simulated indoor light fading for three or more years, in which the difference of the ΔE in the CIELAB color space indication system becomes 10 or smaller.

In case using a dye-based black ink, the dye usable for the ink is, for example, exemplified by at least one selected from those expressed by the following general formulae (IV) to (VI).

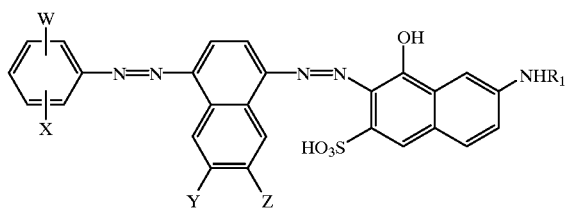

(IV)

(Where, W represents carboxyl group, X represents hydrogen atom, carboxyl group, or the sulfo group, Y represents hydrogen atom, carboxyl group, or sulfo group, Z represents hydrogen atom, carboxyl group, or sulfo group, $R_1$ represents hydrogen atom or an alkyl group substituted by at least one of carboxyl group and alkoxyl group, a substituted or nonsubstituted phenyl group, or a substituted or nonsubstituted alkanoyl group, respectively.)

In the general formula (IV), a carboxyalkyl group represented by the $R_1$ can be preferably exemplified by a carboxyalkyl group having an alkyl group of 1 to 6 carbon atoms (referred to as "$C_{1-6}$ alkyl", hereinafter the same is applied similarly), and more preferably $C_{1-4}$ alkyl group.

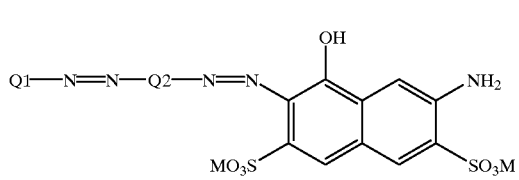

(V)

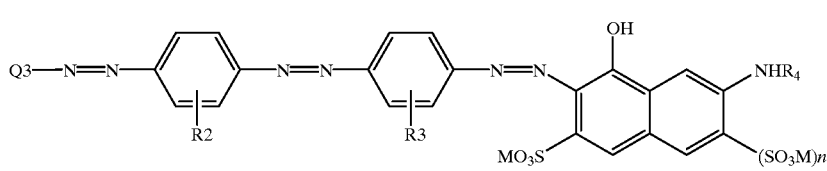

(VI)

(In the formula, Q1 represents phenyl group or naphthyl group substituted by at least one selected from a lower alkylcarbonyl amino group and a lower alkoxy group; or naphthyl group substituted by sulfo group, Q2 represents naphthyl group substituted by sulfone group, phenyl group substituted by a lower alkoxy group, $R_2$ and $R_3$ individually and independently represent a lower alkyl group, a lower alkoxy group, or a lower alkylcarbonyl group, $R_4$ represents hydrogen atom or phenyl group substituted by sulfo group, n is 0 or 1, M is an alkali metal or ammonium group which may be substituted.)

As the lower alkylcarbonyl amino group in a dye structure expressed by the general formulae (V) and (VI), $C_{1-4}$ alkylcarbonyl amino groups are preferable, as the lower alkoxy group, $C_{1-4}$ alkoxy groups are preferable, and as the lower alkyl group, $C_{1-4}$ alkyl groups are preferable.

Specific examples of the dye expressed by the general formula (V) described above are, for example, exemplified by the following structural formulae 23 to 27.

Compound Example 23

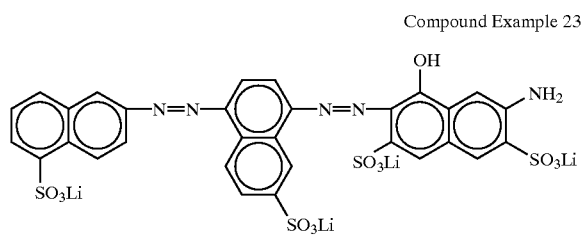

Compound Example 24

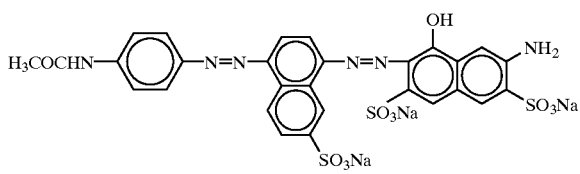

-continued

Compound Example 25

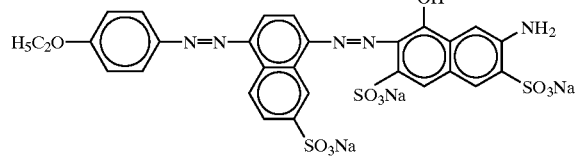

Compound Example 26

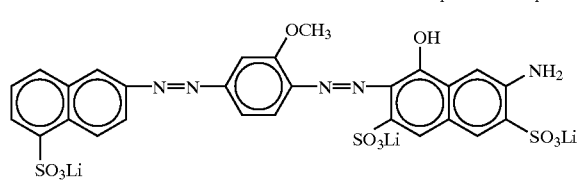

Compound Example 27

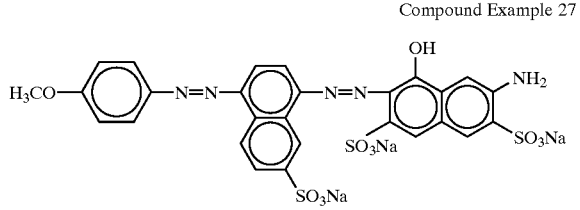

The dye expressed by the general formula (VI) is, for example, exemplified by the following exemplary compounds 28 to 32.

range is higher than the absorbance of the second color ink at the maximum absorbance wavelength in the visible light range, as described above are exemplified. Among two color inks described above, a preferable second color ink is that, for example, when a 100% solid printed part is formed on the recording medium (for example, the normal paper) using the second color ink, for example, the printed part is visible with eyes. Such the second color ink is, for example, one of which the absorbance at the maximum absorbance wavelength in the visible light range is 1/20 or more and less than 1 of the absorbance wavelength of the first color ink in the visible light range. More specifically, in case using the color inks described above, it is preferable to contain an amount over 2% by weight of the first color ink to the total amount Compound Example 28

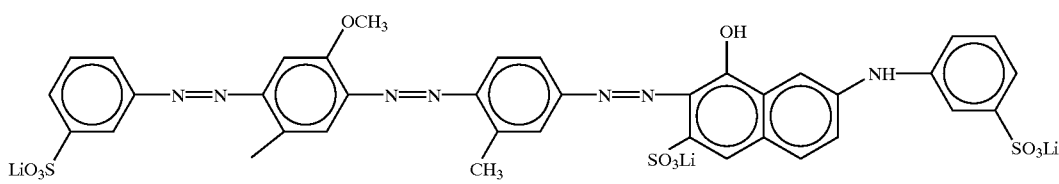

Compound Example 29

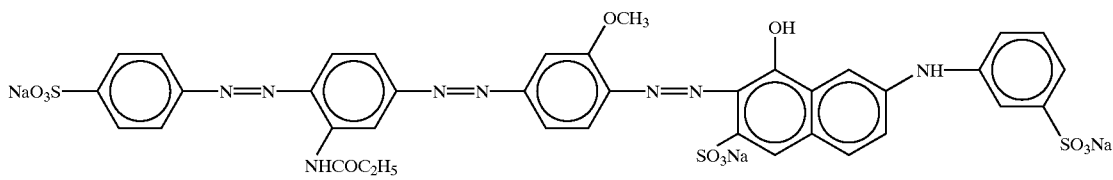

Compound Example 30

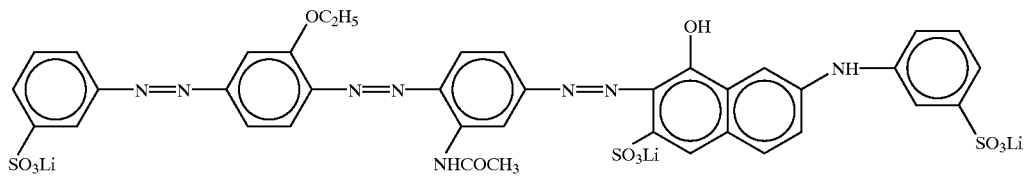

Compound Example 31

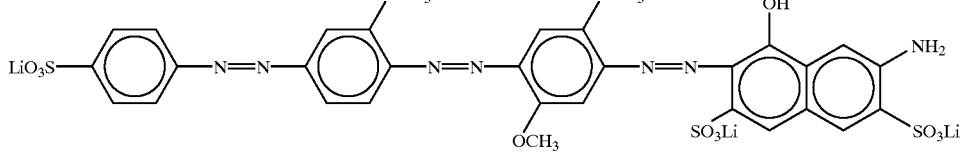

Compound Example 32

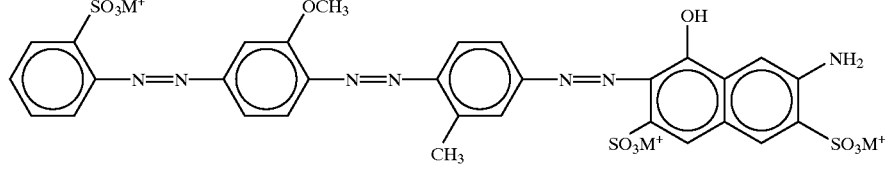

[$M^+$: $NH(C_2H_4OH)_3$]

Other than these, for example, C. I. Direct Black 17, 19, 32, 51, 71, 90, 108, 146, 154, 168, 195, C. I Food Black 1, and 2 can be exemplified. These black dyes may be, independently or in a range within the scope of the present invention, used in a proper combination.

As other ink sets according to the present invention, the ink sets, in which a first color ink and a second color ink, which have same color tone, are contained as the color ink of 2 or more species and an absorbance of the first color ink at a maximum absorbance wavelength in a visible light or the ink and hence, it is preferable to use the ink containing the a mount of 2% by weight or less, for example, of the coloring material concentration to the total amount of the ink to be properly selected to satisfy a condition described above, as the second color ink.

In addition, it is preferable that the light resistance of the image yielded by the second color ink is of a similar degree to or larger than the light resistance of the image yielded by the first color ink.

In the case where as the magenta ink in the ink set, two ink species of the first color ink described above and the second color ink described above are contained, it is preferable to use one containing the coloring material expressed by the general formula (I) described above as a only one coloring material in the second color ink. In the case where as the cyan ink, two ink species of the first color ink described above and the second color ink described above are contained, it is preferable to use one containing the Direct Blue 199 as only one coloring material for the cyan ink with a low coloring material concentration.

In addition, preferable ink sets according to the present invention are those comprising the color ink in which the ΔE after the light resistance test of each image yielded by each color ink is 20 or lower and more preferably, 15 or lower.

Solvent

The ink solvent or dispersant, which contains the coloring material for the color ink, as described above is exemplified by water or water and the water-soluble organic solvent. And, the water-soluble organic solvent is exemplified by a one similar to that described in the black ink described above. In addition, in the case where the color ink is attached to the recording medium by the ink jet method (for example, the bubble jet method), it is preferable to prepare to provide viscosity and surface tension desired for the ink in order to realize excellent ink jet discharge characteristics described above.

Penetrability of color ink

About the color ink described above, making the Ka value of the ink to 5 or higher, for example, is preferable to form the high quality color image on the recording medium. The ink in having such Ka value has the high penetrability in the recording medium and therefore, for example, even in the case where the images of at least two colors selected from yellow, magenta, and cyan are adjacently recorded, bleeding of the color between adjacent images can be prevented. In the case where a secondary color image is formed by overlaying of these inks, due to high penetrability of each ink species, bleeding between adjacent images of different colors can be effectively inhibited. As the method to prepare the Ka value of the color ink to such value, for example, conventionally and publicly known methods, for example, adding the surfactant, adding penetrable solvent such as glycol ether and the like can be employed. Needless to say, amount for addition may be properly selected.

Preferably, the color ink according to the present invention is, as described above, made as that containing the dye unstabilize dispersion stabilization of the pigment in the black ink when blended with the black ink or that containing the dye and the additive, which unstabilizes dispersion stabilization the black ink when blended with the black ink. Specifically, the color ink may prepared on the basis of either of aspects of (1) and (2) mentioned previously concerning reactivity of the black ink with the color ink or aspects of i) to v) or the color ink and the black ink may prepared using the material usable for each ink described above by proper selection.

Moisture retentive agent

In addition, in order to keep moisture retention of the ink, a moisture retentive solid component such as urea, a derivative of urea, trimethylol propane, and the like can be used as the ink component. It is preferable that content of the moisture retentive solid component such as urea a derivative of urea, trimethylol propane, and the like in the ink generally ranges from 0.1 to 20.0% by weight to the ink and more preferably, ranges from 3.0 to 10.0% by weight. In addition, the ink according to the present invention may contain, other than the components described above, various additives such as the surfactant, the pH adjuster, a rust inhibitor, an antiseptic, an antifungal agent, the antioxidant, an antireducing agent, evaporation enhancer, chelator, a water soluble polymer, and the like, when required.

Light resistance test

As means for evaluating light resistance in the present invention, the light resistance test is adopted and the light resistance test is preferably conducted under the condition in consideration of an environment including the solar light passed through the window in a room, where the image is conserved. An irradiation in the light resistance test is preferably 6,000 klux·hr or higher in consideration of long term conservation. For example, the test under irradiation of 63 klux for 100 hours is equivalent to the test considering conservation under indoor irradiation of the solar light of 5 klux·hour per day for 3 years or longer.

Preferably, conditions of this light resistance test are employed in consideration of the solar light passed through the window in a room. More preferably, it is carried out under each condition in consideration of the solar light passed through the window in a room, after ISO10977.

An illuminance is 6 klux according to the ISO standard; however, if the test is conducted under 6,000 klux/hr or higher illuminance, a test period must be prolonged. Therefore, unless results yielded do not conflict, the illuminance may be increased to shorten the test period.

Recording medium

The medium for printing the image of the light resistance test is not restricted; however, a special medium is preferably used. The special medium is, in order to make absorbance, coloration, and resolution better, the recording medium, for example, having a porous layer consisting of an inorganic particle (such as alumina hydrate), a porous particle layer (a porous particle and a binder), a porous high polymer layer (a mixture layer made from an organic particle and inorganic particle), or the like on a substrate. Those are called a glossy paper, a coated paper, and a glossy film.

Ink jet recording apparatus and ink jet recording method

Figure 1B:
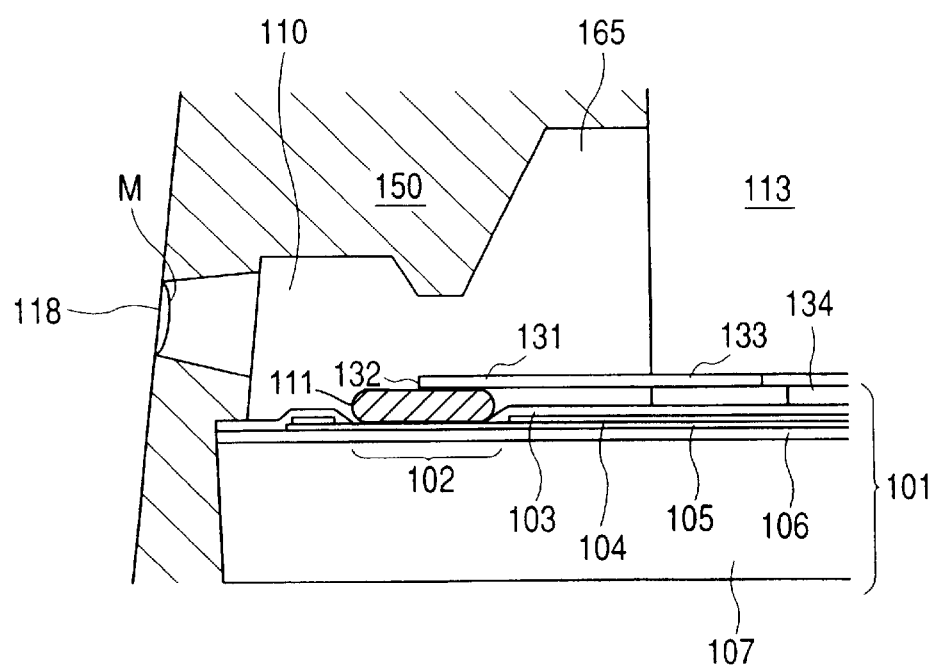

FIGS. 1A and 1B are longitudinal section views of the ink jet head according to the present invention and FIG. 1A is a head having a protection film described later and FIG. 1B is that lacking the protection film.

In this ink jet head, as discharge energy generating member to discharge the ink, a heating generating member 102 applying heat energy to the ink is mounted on a smooth element substrate 101 and a liquid flow path 110 is arranged on the element substrate 101 corresponding to the heating generating member 102. The liquid flow path 110 is communicated with a discharge port 118 and communicated with a common liquid chamber 113 to supply the ink to a plurality of liquid flow paths 110 and receives the ink of the volume matching the ink discharged from the discharge port 118 from this common liquid chamber 113. A symbol M represents a meniscus formed by the liquid discharged and the meniscus M is balanced to an internal pressure, which is normally a negative pressure, of the common liquid chamber 113 around the discharge port 118 by a capillary force, which is created by the discharge port 118 and an internal wall of the liquid flow path 110 communicated therewith.

The liquid flow path 110 is configured by jointing the element substrate 101 having the heating generating member 102 to a ceiling board 150 and in a region around a face to which the heating generating member 102 and the liquid discharged contact, a bubble generating region 111 to generate bubbles in the liquid discharged by rapid heating of the heating generating member 102 exists. At least a part of a movable member 131 is arranged to face to the heating generating member 102 in the liquid flow path 110 having this bubble generating region 111. This bubble generating region 111 has a free end 132 in an upstream side toward the discharge port 118 and is supported by a supporting member 134 arranged in the upstream side. Particularly, in order to suppress growth, which influences to a back wave toward the upstream side and an inertial force of the ink, of bubbles in a half of the upstream side, the free end 132 is arranged around a center of the bubble generating region 111. And, the movable member 131 is displaceable to the supporting member 134 in accordance with growth of bubbles generated in the bubble generating region 111. A fulcrum 133 in displacement becomes a supporting part of the movable member 131 in the supporting member 134.

In a central upward position of the bubble generating region 111, a stopper (a regulating part) 164 is located and regulates displacement of the movable member 131 in a certain range to suppress growth of bubbles in the half of the upstream side. In a flow from the common liquid chamber 113 to the discharge port 118, a low flow path resistant region 165, in which a flow path resistance is low relatively in comparison with the liquid flow path 110, is made in the upstream side of the stopper 164 as a boundary. A structure of the flow path in the region 165 lacks a upper wall and has a large sectional area of the flow path and therefore, a resistance thereof of the flow path in movement of the liquid is made small.

According to the structure described above, contact of the movable member 131 displaced with the stopper 164 allows yielding a characteristic structure in that the liquid flow path 110 having the bubble generating region 111 becomes substantially a closed space excluding the discharge port 118.

For reference, in the head described above, the movable member described above may be that installed to inhibit bubbles solely growing upward direction on the ink flow going to the discharge port described above. More preferable configuration, the free end of the movable member described above is positioned substantially in a central part of the bubble generating region described above. According to this configuration, it is possible to inhibit the back wave toward the upstream side and the inertial force of the ink, which are directly regardless of ink discharge, caused by growth of bubbles and also to orient smoothly a component of bubbles grown in downstream side to the direction of the discharge port.

In addition, in the head described above, an adoptable configuration is that in which the flow path resistance of the low flow path 110 in a side opposite to is low the discharge port described above with the regulating part 164 described above as the boundary.

According to this configuration, movement of the ink toward the upstream direction by growing bubbles becomes large flow by the liquid flow path 110 of the low flow path resistance and therefore, when the movable member 131 displaced contacts with the regulating part 164, the movable member 131 is applied with a stress to draw to the upstream direction. As the result, if debubbling is started in this state, the force to move the ink toward the upstream direction by growing bubbles largely remains and therefore, during a certain time in which a repellent force of the movable member 131 becomes superior to this force to move the ink, the closed space described above can be held. In other words, according to this configuration, high speed meniscus drawing is made more sure. On the other hand, when a debubbling step described above progresses and the repellent force of the movable member 131 becomes superior to this force to move the ink toward the upstream direction by growing bubbles, the movable member 131 displaces to downward to recover an initial state and in accordance with this, in the low flow path resistant region, the flow to the downstream occurs. The flow path resistant is small in the flow to the downstream direction in the low flow path resistant region and therefore, a large flow is suddenly occurs to flow in the liquid flow path 110 through the regulating part 164. As the result, through liquid movement to the downstream direction toward the discharge port, drawing of the meniscus M described above can be abruptly stopped to stop rapidly vibration of the meniscus M.

For reference, the regulating part 164 is sufficient to be that formable the state of an almost constant component of bubbles in the upstream side and not restricted to that presented in the examples described above.

A ceiling board, on which the liquid flow path 110, the discharge port 118 communication with the liquid flow path 110, a groove constituting the low flow path resistant region 165 and the common liquid chamber 113 are provided, is arranged on the element substrate 101. In the element substrate 101, a silicon oxide film or a silicon nitride film 106 for a purpose of insulation and preservation of heat is formed on the base body 107 made of silicon or the like, and thereon an electric resistance layer 105 (0.01 to 0.2 $\mu$m in thickness) such as hafnium boride ($HfB_2$), tantalum nitride (TaN), tantalum aluminium (TaAl), and the like composing the heat-generating member 2 and a wire electrode 104 (0.2 to 1.0 $\mu$m in thickness) such as aluminum or the like are patterned. A voltage is applied from this wire electrode 104 to the resistance layer 105 to flow an electric current in the resistance layer for heating it. On the resistance layer between the wiring electrodes, a protection layer 103 made of such as silicon oxide or a silicon nitride is formed in a 0.1 to 2.0 $\mu$m thickness and thereon, the cavitation resistant film 112 (0.1 to 0.6 $\mu$m thickness) of tantalum or the like is formed to protect the resistance layer 105 from various liquid such as the ink.

Particularly, the pressure and a shock wave created in occurrence of bubbles and debubbling very decreases durability of the oxide film very strong, hard and brittle and thus, a metal material such as tantalum (Ta) or the like is used as the cavitation resistant layer 112.

The combination of the liquid, the liquid flow path, and a resistance material allows configuration unnecessary of the protection layer 103 on the resistance layer 105 described above. Material of the resistance layer 105 unnecessary of such protection layer 103 is exemplified by iridium-tantalum-aluminium alloy.

Described above, the heating generating member described above may configured by only the resistor layer (heat-generating part) between electrodes described above and also may be that containing the protection layer protecting the resistor layer.

Figure 2A:
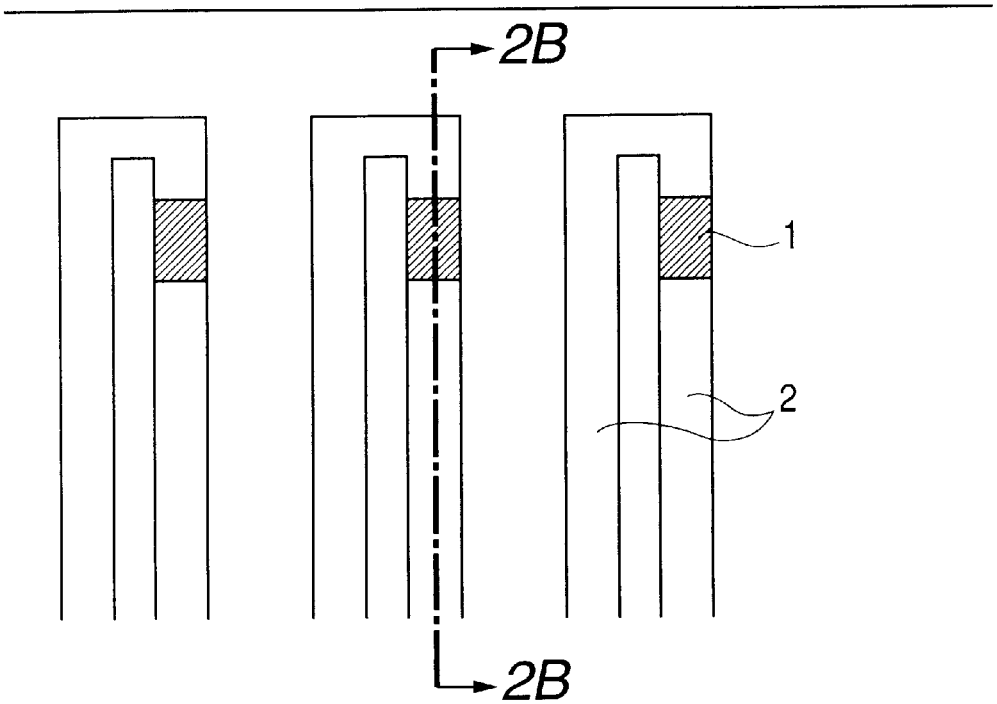
FIGS. 2A and 2B are views showing a base body for the ink jet head.
Figure 2B:
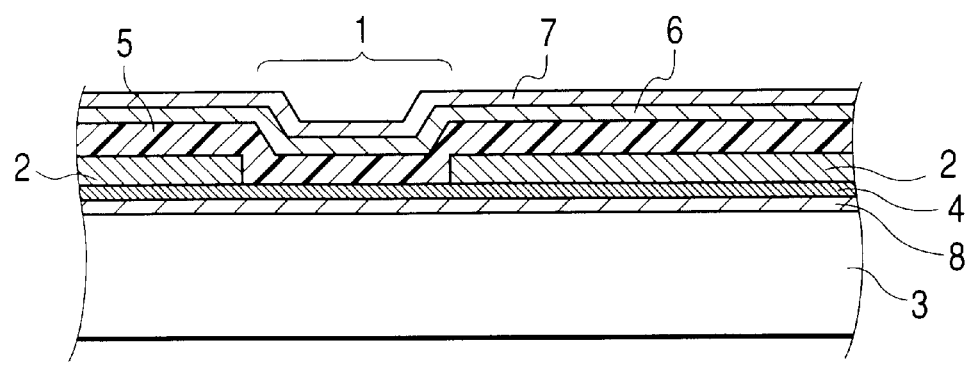

The configuration of the cavitation resistant layer 112 in the part, in which the color ink containing the polyvalent metal salt is discharged, will be further described below. FIGS. 2A and 2B are figures showing the configuration of the cavitation resistant layer used for discharge of the color ink containing the polyvalent metal salt. This configuration may be used for discharge of the ink containing no polyvalent metal salt.

FIG. 2A is a diagrammatic top view showing a main part of the base body for the head and FIG. 2B is a diagrammatic side-sectional view by cutting along a double dashed chain line 2B—2B of FIG. 2A.

As shown in FIGS. 2A and 2B, the silicon oxide film is formed as the heat reserving layer 8 on an Si substrate 3 and thereon, Al layers is each formed in a predetermined pattern as the heat-generating resistor member layer 4 and the electrode wiring 2. The portion of the heat-generating resistor member layer 4 located in a space between a pair of the electrode wiring 2 becomes the heat-generating part 20 rapidly heat and boil the ink on the top face.

To cover these heat-generating resistor member layer 4 and electrode wiring 2, silicon nitride film is formed as a protection film 5 to keep insulation between mainly the electrode 2 and thereon, an amorphous alloy film containing Ta with high anticorrosion performance against the ink as a lower-layered cavitation resistant film 6 and a Ta film relatively good in kogation property as an upper-layered cavitation film 7 are sequentially formed. The upper-layered cavitation film 7 is the film low in anticorrosion performance against the ink than that of the lower layer.

The amorphous alloy containing Ta as a first cavitation resistant film 6 can be exemplified by alloys containing Ta, Fe, Ni, Cr, or the like. Such alloy makes the anticorrosion performance against the ink high. Further, one or more kinds of atoms selected from a group consisting of Ti, Zr, Hf, Nb, and W may be contained.

In addition, as the amorphous alloy described above, the amorphous alloys expressed by a composition formula (I): $Ta_\alpha Fe_\beta Ni_\gamma Cr_\delta$ (where, 10 atomic % $\leq \alpha \leq 3.0$ atomic %, and $\alpha+\beta<80$ atomic %, and $\alpha<\beta$ and $\delta>\gamma$, and $\alpha+\beta+\gamma+\delta=100$ atomic %) and containing Ta are more preferable. In this case, the amount of Ta is in a range from 10 atomic % to 30 atomic % which is set lower than the amorphous alloy film containing Ta and having the composition described above. Adopting such low Ta ratio gives a proper amorphous region to the alloy to passivate it, reduces significantly a number of crystal interfaces, and can improve the ink resistance performance keeping the cavitation resistant performance on a good level.

Particularly, the effect as passivated film is expressed to the ink containing the component which forms the polyvalent metal salt and a chelated complex to allow preventing corrosion by the ink. For reference, it is more preferable that the $\alpha$ in the composition formula (I) described above is 10 atomic % $\leq \alpha \leq 20$ atomic %. In addition, $\gamma \geq 7$ atomic % and $\delta \geq 15$ atomic % are preferable and $\gamma \geq 8$ atomic % and $\delta \geq 17$ atomic % are also more preferable.

On the other hand, Ta as a second cavitation resistant film 7 is Ta (also called $\beta$Ta) constructed by a crystal structure of tetragonal system and the Ta film (layer) having a characteristic of gradual removal by cavitation occurring in debubbling of bubbles in the heat-generating part 20 and having the crystal structure of tetragonal system formed by sputtering using a target of a metal Ta of a purity 99% (mentioned later) or higher.

The method for manufacturing the base body for the ink jet head having the structure described above will be described below with reference to the FIG. 3 and the FIG. 4.

Figure 3A:
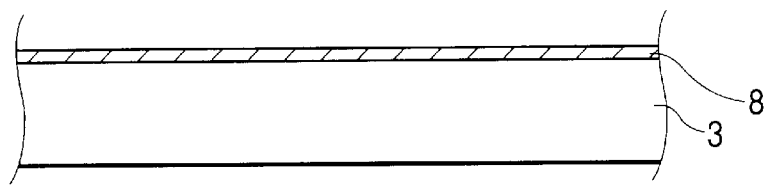
FIGS. 3A, 3B, 3C and 3D are views showing steps of a former stage of the method for manufacturing the base body for the ink jet head shown in the FIGS. 2A and 2B.

As shown in the FIG. 3A, by thermal oxidization method, sputtering method, CVD method, or the like, the silicon oxide film to become the heat reserving layer 8 as an underlay of the heat-generating resistor member on the Si substrate 3 is formed in 2,400 nm thickness.

Figure 3B:
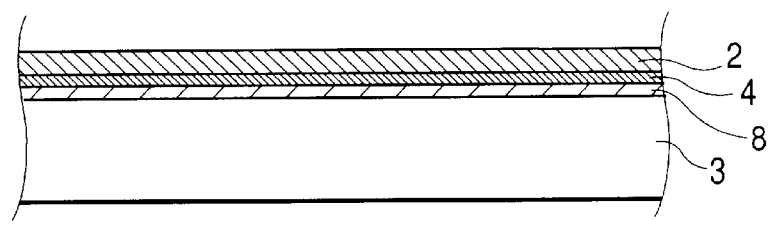

Next, as shown in the FIG. 3B, on the heat reserving layer 8, a TaN layer to become the heat-generating resistor member layer 4 is formed in 100 nm thickness by reactive sputtering and the Al layer to become the electrode wiring 2 is formed in 500 nm thickness by sputtering.

Figure 3C:
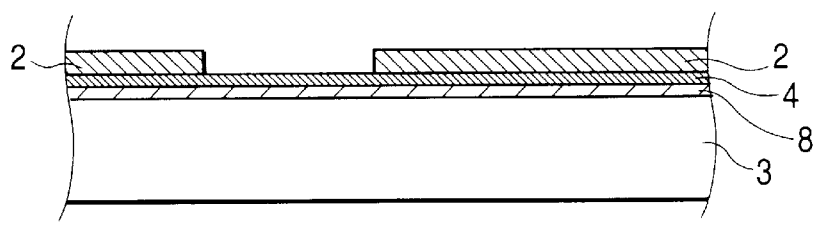

Next, by applying photolithographic method, the Al layer is subjected to wet etching and also the TaN layer is subjected to reactive etching to form the electrode wiring 2 and the heat-generating resistor member layer 4 having a shape of the section as shown in the FIG. 3C (for plan shape, refer to the FIG. 1A). The heat-generating part 1 shown in the FIG. 1 is the part, in which the Al layer on the heat-generating resistor member layer 4 is removed, to generate heat which is applied to the ink when the electric current is run across the electrode wiring 2.

Figure 3D:
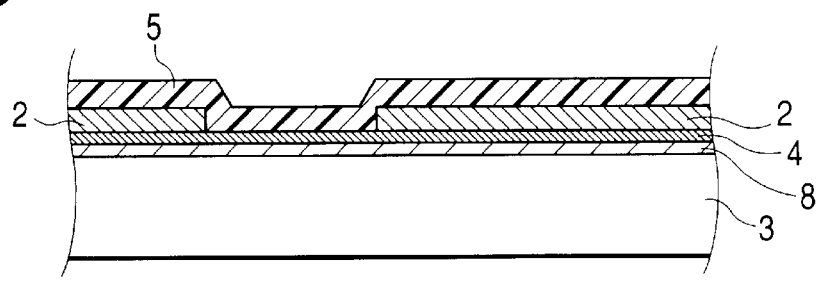
Figure 4A:
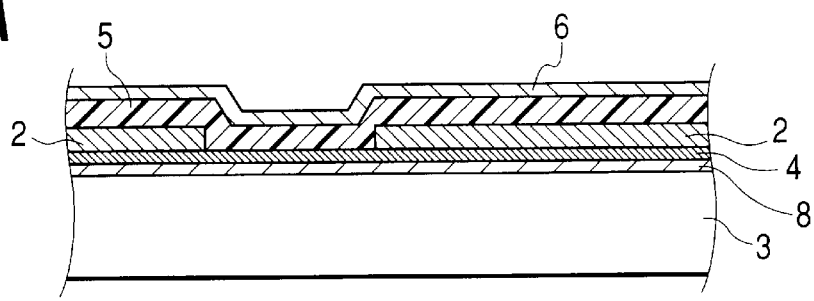
FIGS. 4A, 4B, 4C and 4D are views showing steps following the steps shown in the FIGS. 3A, 3B, 3C and 3D.

Next, as shown in the FIG. 3D, by the sputtering method, the silicon nitride film is formed in a thickness of 1000 nm as the protection film 5 and as shown in the FIG. 4A, the amorphous Ta-containing alloy film, of which composition is Ta: about 18 atomic %, Fe: about 60 atomic %, Cr: 13 atomic %, and Ni: about 9 atomic % (hereinafter, referred to as "a-Ta(Cr,Fe,Ni)"), as the cavitation resistant film 6 being the lower layer is formed in a thickness of about 100 nm. The amorphous Ta-containing alloy film can be also formed by, other than the sputtering method using an alloy target consisting of Ta-se-Cr-Ni, two-dimensional simultaneous sputtering method in which a Ta target and an Fe-Cr-Ni target are separately used and 2 sets of power supply individually connected thereto applies separate powers.

Figure 4B:
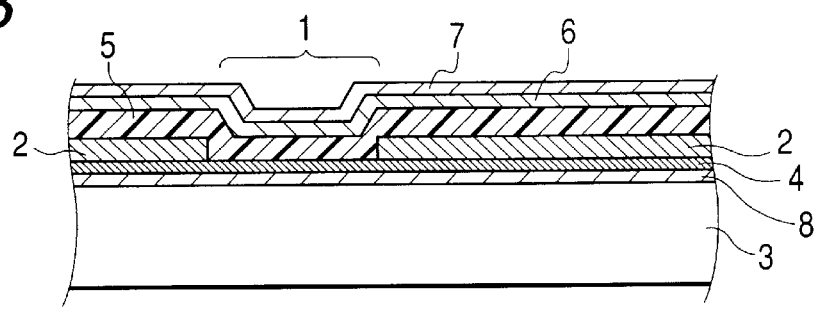

Further, as shown in the FIG. 4B, the Ta (also called $\beta$Ta) layer, which is constructed by the crystal structure of tetragonal system, as the cavitation resistant film 7 being the upper layer is formed in the thickness of about 150 nm by magnetron sputtering using the target of the metal Ta of the 99% purity or higher (preferably, 99.99%). If $\beta$-Ta of the crystal structure described above can be formed, other sputtering method may be employed other than magnetron sputtering.

In this occasion, a surface layer of the lower layer of an a-Ta(Cr, Fe, Ni) layer being the amorphous alloy film containing Ta is doped with Ta. An amorphous structure of the a-Ta layer is not largely changed. It can be said that by doping with Ta in the surface layer region, Ta becomes rich in the surface layer. In this occasion, the a-Ta(Cr, Fe, Ni) layer is relatively rich in Cr and thus, it can be said that Ta rich doping is carried out for the passivated surface layer of Cr or the like. And, this portion is presumed as a factor to improve durability of at least the protection layer.

Figure 4C:
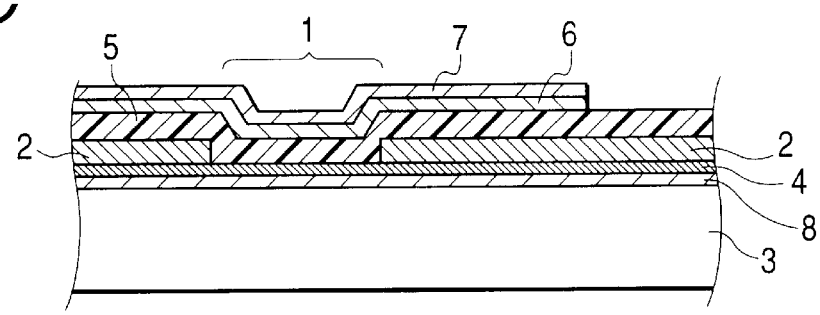

Next, as shown in the FIG. 4C, a resist pattern is formed on Ta by using photolithographic method and the Ta layer of the upper layer and the amorphous alloy film, containing Ta, of the lower layer are continuously etched with an etching solution containing hydrofluoric acid and nitric acid as the main component to make a predetermined shape.

Figure 4D:
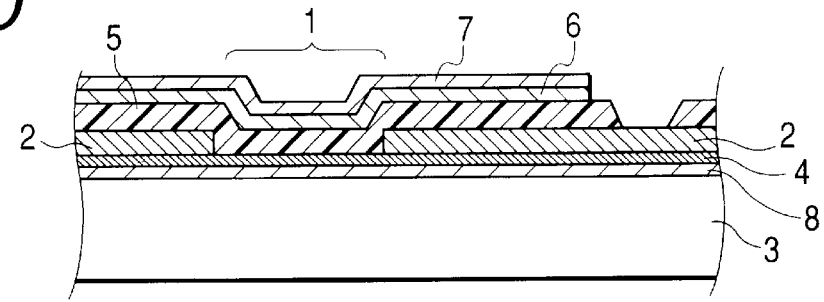

Next, as shown in the FIG. 4D, the resist pattern is formed on the protection film by using photolithographic method and an electrode pad constituted of the Al electrode necessary for connection to an external power supply is exposed by dry etching by using $CF_4$ gas to complete producing of the main part of the base body of the ink jet recording head.

For reference, as U.S. Pat. No. 4,429,321 an integrated circuit to actuate the heat-generating resistor member may be mounted on the same Si substrate. In this case, the integrated circuit part is, similar to the wiring part, preferable to be covered with the protection film 5, the first cavitation resistant film 6, and the second cavitation resistant film 7.

Figure 5A:
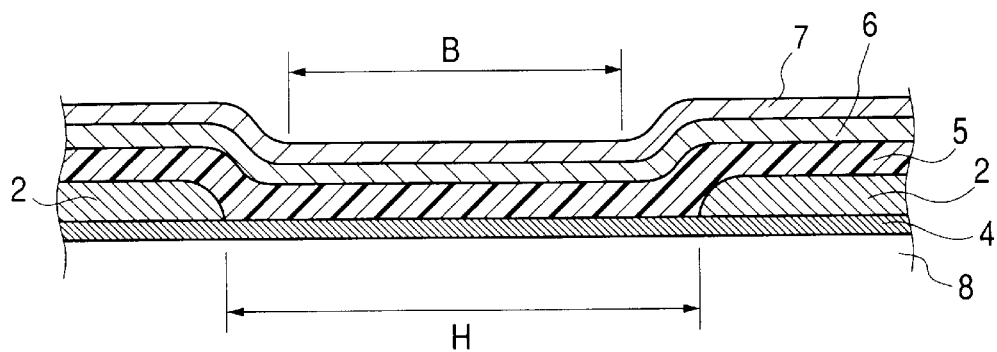
Figure 5A:
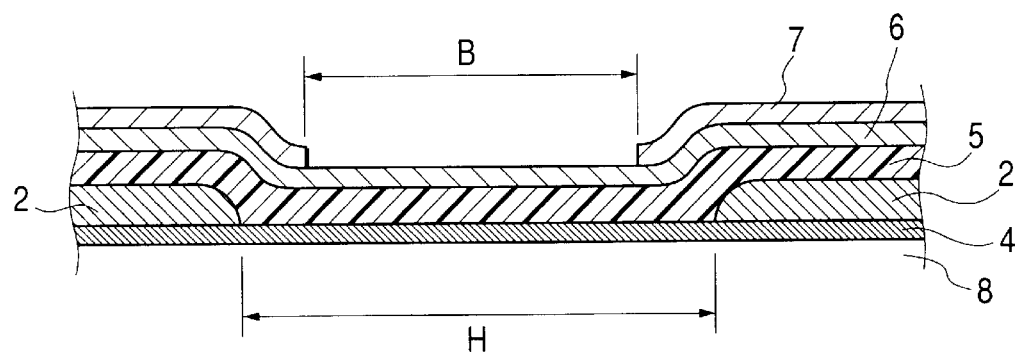
Figure 5A:
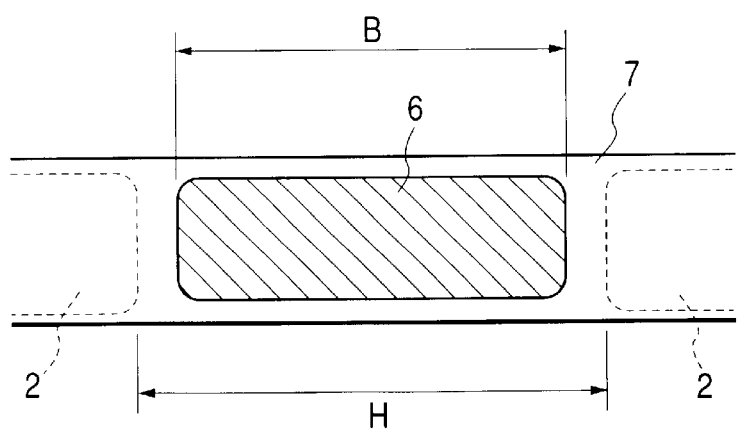

Hereby, in accordance with increase in a heat-generating member actuating pulse number, the change of the cavitation resistant film by the ink containing the polyvalent metal salt high in Ta corrosiveness is shown in FIGS. 5A, 5B1 and 5B2. FIGS. 5A, 5B1 and 5B2 are enlarged views of a place around the heat-generating part shown in FIG. 2B. FIG. 5A is the sectional view of the film at the heat-generating member actuating pulse number $\leqq 2\times 10^8$, FIG. 5B1 is the sectional view of the film at the heat-generating member actuating pulse number $>2\times 10^8$, and FIG. 5B2 is a top view in the state of FIG. 5B1. In these figures, B shows an effective bubbling region and H shows the heat-generating member region.

The state in the initial state shown in FIG. 5A is shown. This state is not limited to the case where the cavitation resistant film 7 is the Ta film, but also same in case using TaAl.

On the other hand, when the heat-generating member actuating pulse number is increase from the initial state shown in FIG. 5A, the Ta film 7 contacting with the ink high in Ta corrosiveness is gradually corroded and soon, the amorphous alloy film 6 contacting Ta is exposed, as shown in the same FIGS. B1 and B2, in the effectively bubbling region (region where heat generated in region (heat-generating member region) occupied by the heat-generating resistor member between electrode wiring effectively works on bubbling of the ink) and progress of corrosion by the ink described above is stopped at the interface between the amorphous alloy film 6 contacting Ta and the Ta film 7. This effect is expressed not only in the case as the present example where the cavitation resistant film 6 being the lower layer is made of the amorphous alloy film 6 containing Ta, but also in the case using that, which has anticorrosive performance against the ink, for example, the cavitation resistant film 6 in which the oxide film containing Cr oxide is formed on the surface thereof.

In the course from FIG. 5A to the FIG. 5B1, a β-Ta layer, which is reduced, receives the pressure by cavitation bubbling of the ink and then, is doped in the amorphous body of the surface layer of the amorphous alloy containing Ta in underlayer thereof or the passivated film thereof. By aging (previously carrying out preliminary droplet discharge as a final step of manufacture) in manufacture of the head and debubbling action in discharge in use, Ta is substantially doped in the amorphous body of the surface layer of the amorphous alloy film containing Ta (also named reverse sputtering). By this, the cavitation resistant surface layer or whole film which is excellent in durability and without occurrence of kogation can be formed. From the above described reasons, in using the base body of the ink jet recording head and the head having it through mounting them on the recording medium, as described above, the layer prepared by doping the amorphous body of the surface layer of the amorphous alloy containing Ta or the passivated film with the β-Ta may be used as the initial surface for the ink and may be used as the layer later exposed. In this occasion, each advantage is: the head of the former can achieve stable discharge rate from the early state; the head of the latter can add a period during which kogation is difficult to be formed during removal of the first surface by cavitation.

Figure 6:
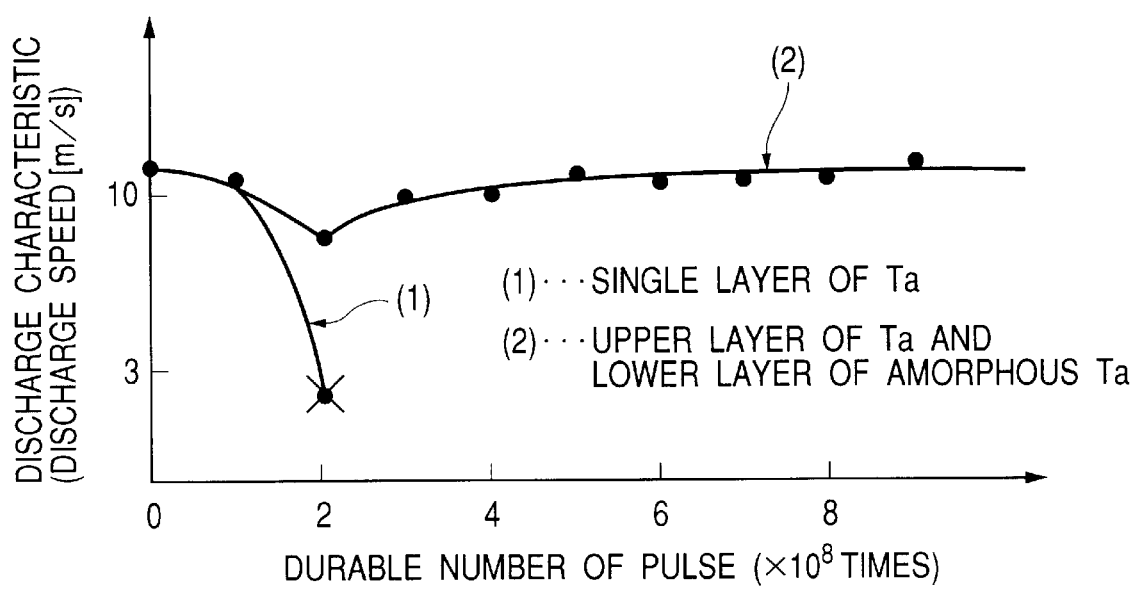
FIG. 6 is a graph of comparing a life time of the cavitation resistant film of the present invention composed of an upper layer of Ta and a lower layer of amorphous alloy containing Ta with a life time of the cavitation resistant film composed of one layer of Ta in the case where the ink having a high Ta corrosive property is used.

From the above descriptions, a life of the heat-generating member part, in which the ink high in Ta corrosiveness is used, is distinctly prolonged, as shown in the FIG. 6, in comparison with the cavitation resistant film made of a single layer of Ta and also, for the heat-generating member part, good bubbling efficiency can be also kept.

Hereby, as the heat-generating member, one using the heat-generating part constituted by the resistor layer to heat in accordance with an electric signal was used. However, not only this, but also one making a bubbling liquid generate bubbles enough to discharge the liquid for discharge is sufficient. For example, photothermal converter, which generates heat by receiving a light such as a laser as the heat-generating part, and the heat-generating member, which has the heat-generating part to generate heat by receiving a radio wave, may be used.

On the above described element substrate 1, in addition to an electrothermal converter configured by the resistor layer 105 configuring the above described heat-generating part and the wired electrode 104 to supply the electric signal to this the resistor layer, a functional device such as a transistor, a diode, a latch, a shift resistor, or the like to actuate selectively this electrothermal converter may be integrally assembled through a semiconductor manufacturing steps.

According to the configuration of the element substrate described above, for the ink easy to cause kogation, following an increase in the heat-generating member actuating pulse, the Ta film of the upper layer is gradually reduced and hence, accumulation of occurrence of kogation is inhibited and bubbling efficiency is not decreased. On the other hand, for the ink high in corrosiveness, following the increase in the heat-generating member actuating pulse number, the Ta film of the upper layer is reduced; however, corrosion stops when reduction of the Ta film reaches the interface between the amorphous alloy layer containing Ta and the upper layer Ta film. Therefore, in case using a plurality of the heat-generating parts, which are arranged linearly on the base body for the head, by separating in ink species, even if the ink easy to cause kogation and the ink easy to corrode Ta are included in those ink species, the base body for the head can satisfy both enough life and reliability.

As the first cavitation resistant film, in case using the amorphous alloy protection layer of $Ta_\alpha Fe_\beta Ni_\gamma Cr_\delta$ (where, 10 atomic % $\leqq \alpha \leqq 3.0$ atomic %. and $\alpha+\beta<80$ atomic %, and $\alpha<\beta$ and $\delta>\gamma$, and $\alpha+\beta+\gamma+\delta=100$ atomic %), the passivated film is formed on the surface thereof. It can be presumed that some constitutional changes of improvement of durability in the interface between the Ta layer of the crystal structure of tetragonal system as the second cavitation resistant film formed by starting sputtering the metal Ta of the 99% or higher purity to this part for formation of the second cavitation resistant film and the amorphous alloy protection layer described above, or a surface area (i. e., the passivated film of such as Cr, Ta, or the like) of the amorphous alloy protection layer.

A first causal factor is that the passivated film region, containing Cr and Ta, of the first cavitation resistant film is doped substantially with Ta, used for the second cavitation resistant film, by magnetron sputtering or the like and hence, the amorphous passivated film containing Ta and Cr of Ta(Fe, Ni, Cr) or the like as the amorphous body is denatured to eliminate a cause of occurrence of kogation and improve durability.

Consequently, on the basis of this first causal factor, it is sufficient that the present invention is the base body, for the ink jet head, having the layer doped with Ta in the amorphous passivated film containing at least Ta and Cr as a first surface to the ink or the layer exposed later and the ink jet head comprising it. Among them, individual advantages are follows: in the former case, a stable rate can be realized since the first discharge rate and in the latter case, the duration period during removal of the first surface by cavitation can be added.

A second causal factor is that Ta(β-Ta) of the crystal structure of tetragonal system formed later than the amorphous structure of the first cavitation resistant film leaves firmly a part thereof on the surface of the amorphous structure to denature the surface and therefore, durability and the action to inhibit attachment of kogation are improved.

This factor may involve in the first causal factor. By the way, this second causal factor expresses independently the effect similar to the first causal factor and in replacing to "the layer doped with Ta" of the first causal factor, in consideration of "the structure of which surface part is added with Ta", this can be presented as an invention.

A third causal factor is that Ta of both the first causal factor and the second causal factor or the one causal factor is doped in the amorphous structure of the first cavitation resistant film or the passivated film thereof by that the β-Ta layer reduced (corroded) receives the pressure created by cavitation. In other words, aging (previously carrying out preliminary droplet discharge as a final step of manufacture) in manufacture of the head and debubbling action in discharge in use, Ta is substantially doped (also named reverse sputtering) to act to Ta to be reduced (corroded), Ta attached firmly to the surface of the amorphous body, and Ta doped in the passivated film. By this, the cavitation resistant surface layer or whole film which is excellent in durability and without occurrence of kogation can be formed.

Needless to say, it would be understood that in finding the first causal factor as a surface first contacting to the liquid ink, by applying aging in the head manufacture described above, the β-Ta crystal structured film described above is previously removed. On the other hand, a complex of the first causal factor, the second causal factor, and the third causal factor and the complex of the first causal factor and the third causal factor can be each used in the present invention.

An ink tank and recording head

Implementation of the present invention will be described below with reference to the drawings.

Figure 7A:
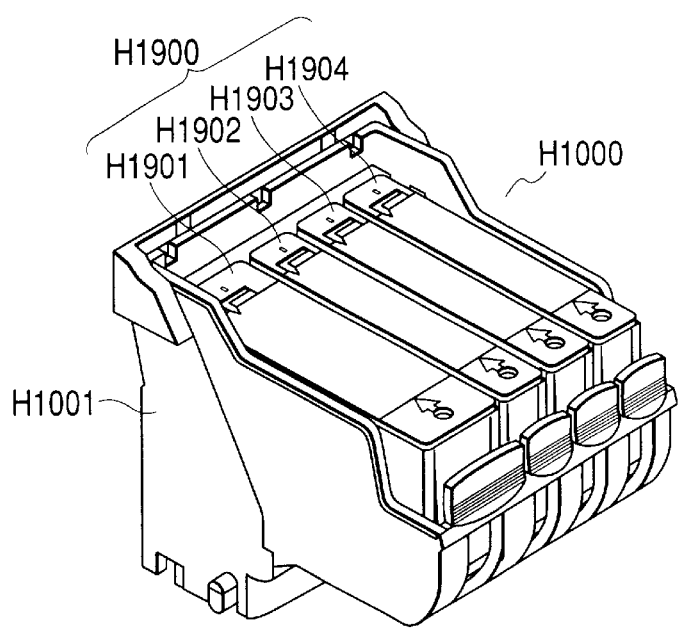
FIGS. 7A and 7B are views showing the configuration of an ink cartridge.
Figure 7B:
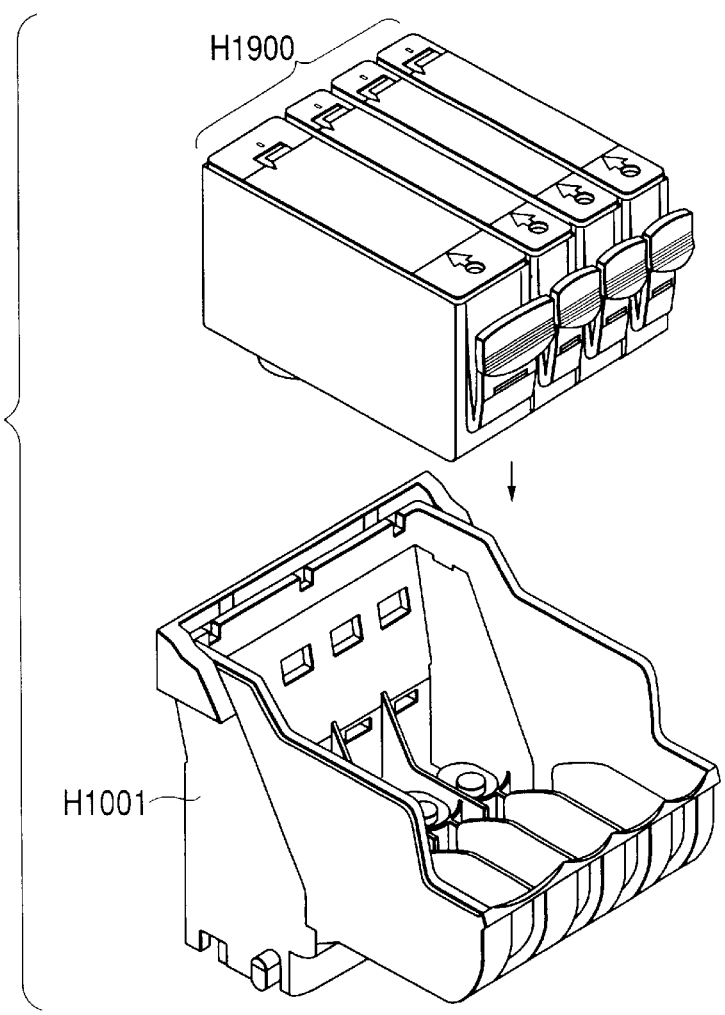
Figure 8:
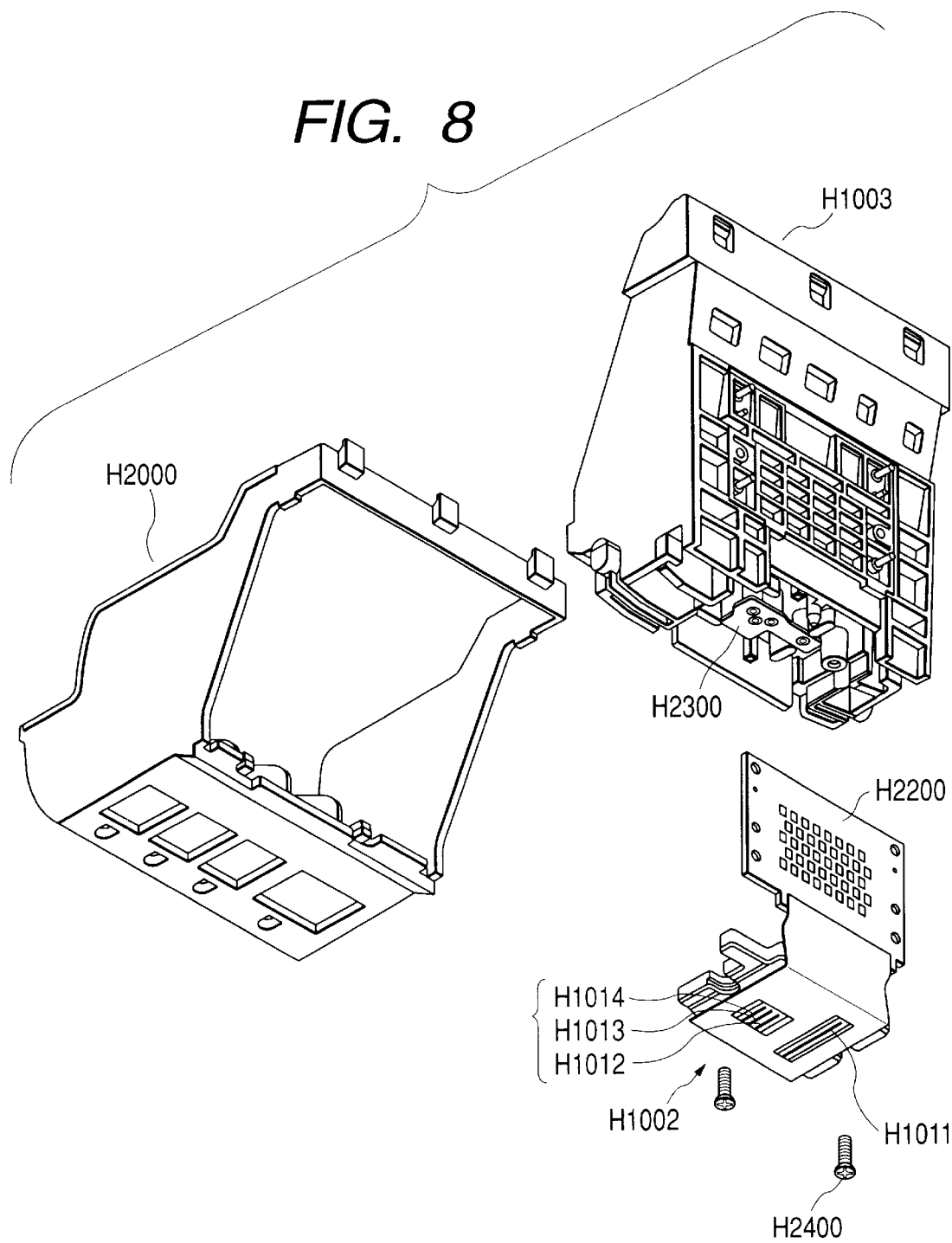
FIG. 8 is a view showing the configuration of the ink cartridge.
Figure 9:
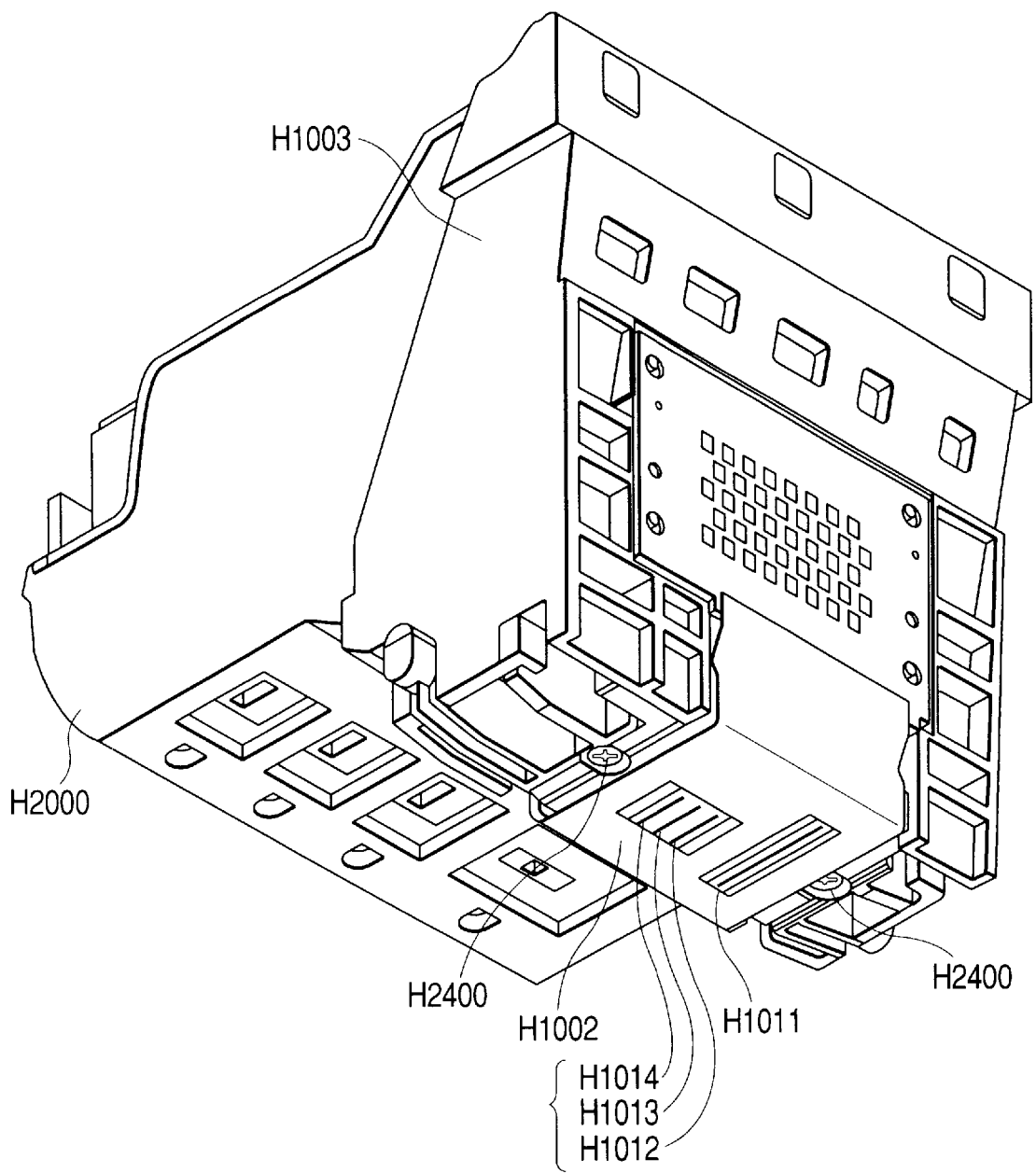
FIG. 9 is a schematic plan view showing a state of installation of the ink cartridge in the recording head.

FIGS. 7A and 7B are perspective views and a broken perspective view showing a recording head cartridge FIG. 8 is the broken perspective view showing a configuration of the recording head shown in FIGS. 7A and 7B. FIG. 9 is the perspective view showing a bottom face side of the head. Each configurational member will be described below with reference to the drawings.

The recording head H1001, as known from the perspective views of FIG. 1A and FIG. 1B, a configurational member configuring the recording head cartridge H1000 and the recording head cartridge H1000 comprises the recording head H1001, the ink tank H1900 (H1901, H1902, H1903, and H1904) attachably and detachably mounted on the recording head H1001. The recording head H1001 discharges the ink (a recording liquid), which is supplied from the ink rank H1900, from the discharge port in accordance with recording information.

This recording head cartridge H1000 is fixed and supported by positioning means of a carriage (not illustrated) mounted on the main body of the ink jet recording apparatus and an electric contact point and is attachable to and detachable from the carriage. The ink tank H1901 is used for the black ink, the ink tank H1902 is used for the cyan ink, the ink tank H1903 is used for the magenta ink, and the ink tank H1904 is used for the yellow ink. Described above, on the basis of that individuals of the ink tanks H1901, H1902, H1903, and H1904 are attachable to and detachable from the recording head H1001 and individuals of the ink tanks are exchangeable, a printing running cost is reduced in the ink jet recording apparatus.

The recording head H1001 is the recording head of a side shooter type of the bubble jet system carrying out recording by using the electrothermal converter (a recording member) generating thermal energy to cause film boiling in the ink in accordance with the electric signal.

The recording head H1001 comprises, as shown in the broken perspective view of the FIG. 8, a recording member unit H1002, an ink supply unit H1003, a tank holder H2000. As shown in this FIG. 8, the recording head H1001 connects the recording member unit H1002 to the ink supply unit H1003 with a bolt H2400 and finally connects to the tank holder H2000. The FIG. 9 shows an as-built drawing thereof. In connecting the recording member unit H1002 to the ink supply unit H1003, in order to communicate an ink communication port of the recording member unit H1002 to the ink communication port of the ink supply unit H1003 to prevent leak of the ink, individual members are fixed with the bolt H2400 to crimp through a joint seal member H2300.

And, an electric contact substrate H2200 of the recording member unit H1002 is positioned to fix in a side face of the ink supply unit H1003 by a terminal positioning pin (two places) of the ink supply unit H1003 and a terminal positioning hole (two places) of the electric contact substrate H2200. As a fixing method, fixing is carried out by, for example, swaging a terminal jointing pin mounted on the ink supply unit H1003 and other fixing means may be applied to fixing. In addition, by fitting to join a jointing hole and a jointing part of the ink supply unit H1003 to the tank holder H2000, the recording head H1001 is completed.

In the recording member unit H1002, as shown in the FIG. 8 and the FIG. 9, a discharge port row H1011 to discharge the black ink supplied from the ink tank 1901, the discharge port row H1012 to discharge the cyan ink supplied from the ink tank 1902, the discharge port row H1013 to discharge the magenta ink supplied from the ink tank 1903, the discharge port row H1014 to discharge the yellow ink supplied from the ink tank 1904 are installed. The discharge port rows H1011, H1012. H1013, and H1014 are arranged in this order in a parallel status each other.

The FIG. 7A and the FIG. 7B described above are figures explaining installation of the recording head H1001 constituting the recording head cartridge H1000 and the ink tanks H1901, H1902, H1903, and H1904 and in the inside of the ink tanks H1901, H1902, H1903, and H1904, inks of colors corresponding described above are contained. In individual tanks, the ink communication port is formed to supply the ink in the ink tank to the recording head H1001. For example, the ink tank H1901 is installed in the recording head H1001 and then, the ink communication port of the ink tank H1901 is pushed to a filter installed in a joint part of the recording head H1001 and the black ink in the ink tank H1901 is supplied from the ink communication port thereof to individual discharge ports of the discharge port rows H1011 through the ink flow path of the recording head H1001.

And, the ink is supplied to a bubbling chamber having the electrothermal converter member and the discharge port to discharge the ink toward a recording paper as the recording medium by thermal energy applied to the electrothermal converter member.

As color inks of cyan, magenta, and yellow contained in the individual ink tanks H1092 to H1904, those of high rate of penetration in the recording paper are used to prevent occurrence of bleeding of the ink on the boundary of colors in formation of the color image. On the other hand, as the black ink contained in the ink tank H1901 to make the black image to a high quality one with the high density and a small degree of feathering, one having a relatively low rate of penetration in the recording paper is used in comparison with the three color inks described above.

Image recording apparatus

Figure 10:
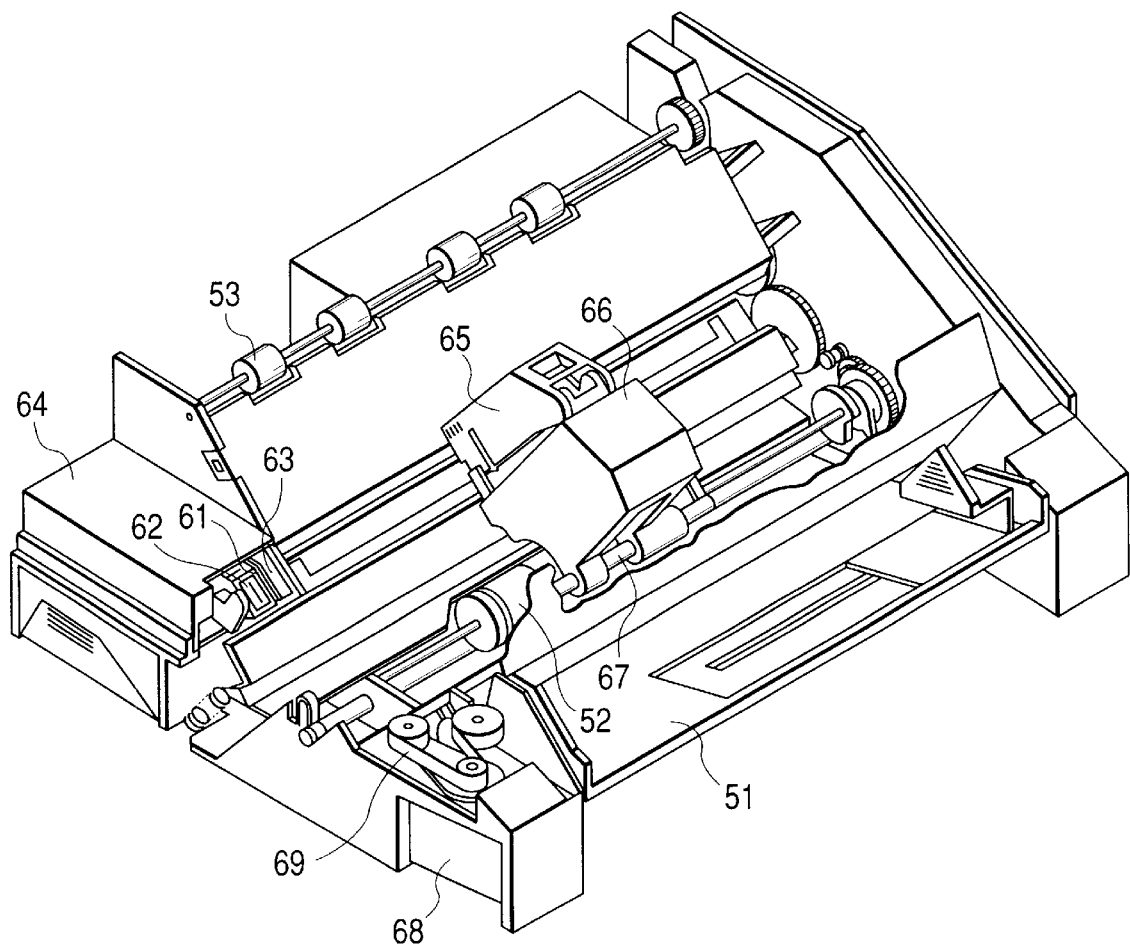
FIG. 10 is a perspective view of an example of an image recording apparatus.

The FIG. 10 shows an example of the image recording apparatus in which the ink jet head is assembled. Here, a blade 61 is a wiping member and the one end thereof is held by a blade holding member to make a fixed end forming a cantilever. This blade has the configuration in which it is arranged in the position adjacent to the area for recording by the recording head and moves to a direction vertical to the direction of movement of the recording head to contact with the face of discharge port and carry out capping.

In addition, a reference numeral 63 denotes an ink absorber installed adjacent to the blade and is held in a form projecting to a movement path of the recording head similar to this blade. A discharge recovery part 64 comprises this blade 61, a cap 62, the absorber 63 and removal of water, dust or the like is carried out on an ink discharge port face by the blade 61 and the absorber 63.

The reference numeral 65 denotes the recording head having discharge energy generating means and discharge the ink to the recording medium opposite to the discharge port face, in which the discharge port is arranged, to carry out recording and the reference numeral 66 denotes the carriage mounted on the recording head 65 to move the recording head. This carriage is slidably engaged with a guiding shaft 67 and a part of the carriage is connected to a belt 69 (not illustrated) driven by a motor 68. By this, a movement of this carriage along with the guiding shaft becomes possible and movement of the recording area and an adjacent area thereto by the recording head become possible.

On the other hand, the reference numeral 51 denotes the recording medium supply part to insert the recording medium and the reference numeral 52 denotes a feeding roller driven by the motor (not illustrated). On the basis of the components, the recording medium is conveyed to the position, i. e., a recording position, opposite to the discharge port face of the recording head and according to progress of recordings exhausted to a exhaust part in which a roller 53.

In the above described configuration, when the recording head is returned to a home position after completion of recording, the cap 62 of a head recovery part 64 retreats from the movement path of the recording head and the blade projects to the movement path. As the result, the discharge port face of the recording head is wiped. For reference, when the cap abuts on the discharge port face of the recording head to carry out capping, the cap is moves to project to the movement path of the recording head.

In the case where the recording head moves from the home position to a recording start position, the cap and the blade are located in the same position as the position in wiping described above. As the result, the discharge port face of the recording head is wiped also in this movement.

Figure 11:
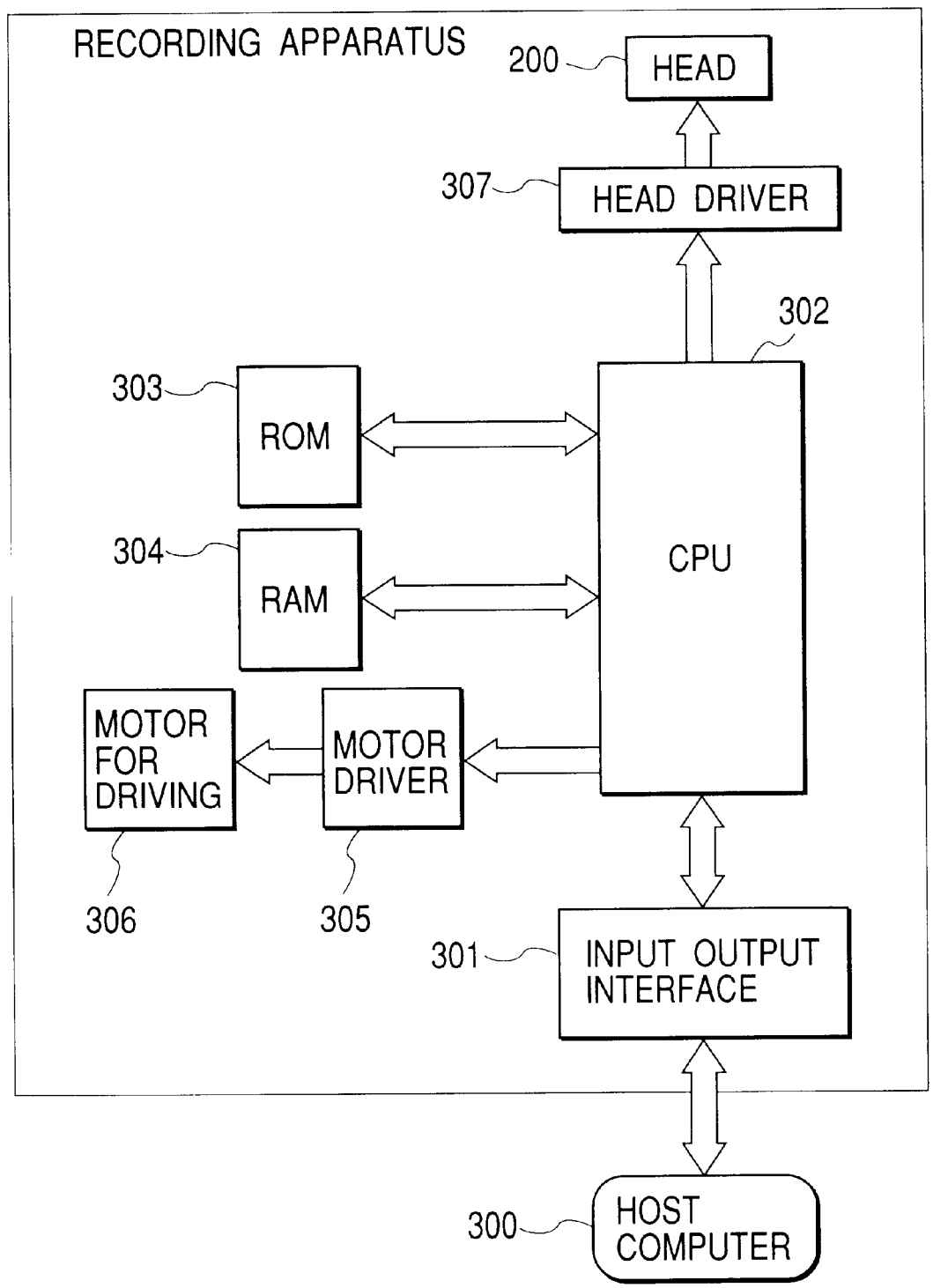
FIG. 11 is a block diagram of a whole of the apparatus for operating the image recording apparatus.

In movement of the recording head to the home positron described above, the recording head moves to the home position adjacent to the recording area at a predetermined time interval not only at the time of recording completion and the time of recovery of discharge, but also during movement in the recording area for recording and in accordance with this movement, wiping as described is carried out The FIG. 11 is a block diagram of the entire apparatus to work the image recording apparatus using the ink jet head.

This recording apparatus receives printing information as control signal from a host computer 300. Printing information is temporarily stored in an input interface 301 inside a printing apparatus and also converted to data processible in the recording apparatus for inputting to a CPU 302, which also works as head-actuating signal supply means. The CPU 302 processes, on a control program stored in a ROM 303, data inputted in the CPU 302 described above using a peripheral unit such as a RAM 304 or the like to convert to data (image data) for printing.

On the other hand, the CPU 302 creates driving data to drive the driving motor to move the recording paper and the recording head synchronizing with the image data in order to record the image data described above in the proper position on the recording paper. The image data and the motor driving data are transmitted to the head 200 and the motor driving 306 through a head driver 307 and a motor driver 305, respectively, and driven in a controlled timing to form the image, respectively.

As the recording medium, that is applicable to the recording apparatus described above and receives such liquid as ink, can be exemplified by various kinds of paper and OHP sheets, a plastic material used for a compact disk and a decorative plate, fabric, a metal plate such as aluminium, copper, and the like, bovine skin, swine skin, leather material such as artificial leather, wood such as tree and plywood, ceramics material such as tile, and three-dimensional structural body such as a sponge, and the like.

On the other hand, the recording apparatus described above is exemplified by a printing apparatus to record on various kinds of paper, OHP sheets, and the like, the recording apparatus for plastics to record on the plastic material such as the compact disk, the recording apparatus for metal to record on a metal plate, the recording apparatus for leather to record on the leather, the recording apparatus for wood to record on wood, the recording apparatus for ceramics to record on ceramics, the recording apparatus to record on the three-dimensional structural body such as the sponge, and the like, and the printing apparatus to record on the fabric.

EXAMPLE

Described below specifically with reference to examples and comparative examples, the present invention is not restricted to the following examples and various modifications can be allowed in a range within the scope thereof. For reference, unless defined specially, "part" and "%" in the following description means will be expressed on mass standard.

First of all, a pigment dispersion 1 was prepared.

Pigment dispersion 1

10 g of carbon black, of which specific surface area was 230 m$^2$/g and DBP oil absorption was 70 mL/100 g, and 3.41 g of p-amino-N-benzoic acid were enough mixed with 72 g of water and then, 1.62 g of nitric acid was dropped to stir at 70° C. In addition, after several minutes, a solution prepared by dissolving 1.07 g of sodium nitride in 5 g of water was added to stir further for 1 hour. Slurry yielded was filtered through a filter paper (commercial name: Toyo Filter Paper No. 2; made by Advantis Co.), a pigment particle filtered was washed enough with water and dried in an oven at 90° C., and water was added to this pigment to prepare a pigment solution of a 10% by weight in pigment concentration. By the method described above, a radical group expressed by the following chemical formula was introduced to the surface of carbon black.

(Chemical formula 3)

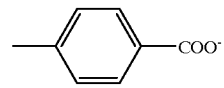

Subsequently, by using each pigment dispersion described above, the black ink 1 and the black ink 2 as a comparative example, were prepared by the following method.

(Black ink 1)

| | |
|---|---|
| Pigment dispersion 1 | 30 parts |
| Ammonium benzoate | 1 part |
| Trimethylol propane | 6 parts |
| Glycerin | 6 parts |
| Diethylene glycol | 6 parts |
| Ethylene oxide-added acetylene glycol (commercial name, "Acetylenol EH"; made by Kawaken Fine Chemicals Corp.) | 0.2 parts |
| Water | balance |

(Black ink 2)

| | |
|---|---|
| Pigment dispersion 1 | 30 parts |
| Trimethylol propane | 6 parts |
| Glycerin | 6 parts |
| Diethylene glycol | 6 parts |
| Ethylene oxide-added acetylene glycol (commercial name, "Acetylenol EH": made by Kawaken Fine Chemicals Corp.) | 0.2 parts |
| Water | balance |

A color ink was prepared by mixing to dissolve the following components by stirring enough and then, filtering by pressurizing with a micro-filter (made by Fuji Film Co., Ltd.) of a pore size 3.0 μm.

(Yellow ink 1)

| | |
|---|---|
| Ethylene oxide-added acetylene glycol (commercial name, "Acetylenol EH"; made by Kawaken Fine Chemicals Corp.) | 1.0 part |
| Trimethylol propane | 6 parts |
| Glycerin | 6 parts |
| 2-pyrrolidon | 6 parts |
| C. I. Acid Yellow 23 | 3 parts |
| Water | balance |

(Magenta ink 1)

| | |
|---|---|
| Ethylene oxide-added acetylene glycol (commercial name, "Acetylenol EH"; made by Kawaken Fine Chemicals Corp.) | 1.0 part |
| Trimethylol propane | 6 parts |
| Glycerin | 6 parts |
| 2-pyrrolidon | 6 parts |
| C. I. Acid Red 52 | 3 part |
| Water | balance |

(Cyan ink 1)

| | |
|---|---|
| Ethylene oxide-added acetylene glycol (commercial name, "Acetylenol EH"; made by Kawaken Fine Chemicals Corp.) | 1.0 part |
| Trimethylol propane | 6 parts |
| Glycerin | 6 parts |
| 2-pyrrolidon | 6 parts |
| C. I. Acid blue 9 | 3 part |
| Water | balance |

In addition, that to which divalent metal salt, which is a precipitation agent of the black pigment, was added to the individual color inks described above was prepared as the color ink described below.

(Yellow ink 2)

| | |
|---|---|
| Ethylene oxide-added acetylene glycol (commercial name, "Acetylenol EH"; made by Kawaken Fine Chemicals Corp.) | 1.0 part |
| Trimethylol propane | 6 parts |
| Glycerin | 6 parts |
| 2-pyrrolidon | 6 parts |
| C. I. Acid Yellow 23 | 3 parts |
| Calcium nitrate salt | 2 parts |
| Water | balance |

(Magenta ink 2)

| | |
|---|---|
| ethylene oxide-added acetylene glycol (commercial name. "Acetylenol EH": made by Kawaken Fine Chemicals Corp.) | 1.0 part |
| Trimethylol propane | 6 parts |
| Glycerin | 6 parts |
| 2-pyrrolidon | 6 parts |
| C. I. Acid Red 52 | 3 parts |
| Magnesium nitrate salt | 2 parts |
| Water | balance |

(Cyan ink 2)

| | |
|---|---|
| Ethylene oxide-added acetylene glycol (commercial name, "Acetylenol EH": made by Kawaken Fine Chemicals Corp.) | 1.0 part |
| Trimethylol propane | 6 parts |
| Glycerin | 6 parts |
| 2-pyrrolidon | 6 parts |
| C. I. Acid blue 9 | 3 parts |
| Magnesium nitrate salt | 2 parts |
| Water | balance |

The inks prepared described above were combined as described below to prepare the ink sets.

TABLE 1

| | Bk | Y | M | C |
|---|---|---|---|---|
| Ex. 1 | Black ink 1 | Yellow ink 2 | Magenta ink 2 | Cyan ink 2 |
| Ex. 2 | Black ink 1 | Yellow ink 1 | Magenta ink 1 | Cyan ink 2 |
| Comparative Ex. 1 | Black ink 2 | Yellow ink 2 | Magenta ink 2 | Cyan ink 2 |
| Comparative Ex. 2 | Black ink 2 | Yellow ink 1 | Magenta ink 1 | Cyan ink 1 |

Table 2 presented below shows main constitutions of ink sets of Example 1 and Example 2 and Comparative Example 1 described above.

TABLE 2

| | Black ink | | Color ink | |
|---|---|---|---|---|
| | Coloring material | Salt | Coloring material | Polyvalent metal salt |
| Ex. 1 | Anionic self-dispersion type carbon black | Present | Dye | Present |
| Ex. 2 | Anionic self-dispersion type carbon black | Present | Dye | Only cyan present |
| Comparative Ex. 1 | Anionic self-dispersion type carbon black | Absent | Dye | Present |
| Com- | Anionic self- | Ab- | Dye | Absent |

TABLE 2-continued

| | Black ink | | Color ink | |
|---|---|---|---|---|
| | Coloring material | Salt | Coloring material | Polyvalent metal salt |
| parative Ex. 2 | dispersion type carbon black | | sent | |

By using the inks of Example 1, Example 2, Comparative Example 1, and Comparative Example 2 described above, recording was carried out on a commercially available copying paper. In the ink jet recording apparatus, the ink jet head shown in the FIG. 1 was mounted. The constitution of the cavitation resistant layer on the heat-generating member is that the second cavitation film is a 99% Ta film and the first cavitation film is $Ta_\alpha Fe_\beta Ni_\gamma Cr_\delta$ (where, 10 at. $\% \leq \alpha \leq 3.0$ at. %, and $\alpha+\beta<80$ at. %, and a $\alpha<\beta$ and $\delta>\gamma$, and $\alpha+\beta+\gamma+\delta=100$ at. %).

Using this ink jet recording apparatus (having an on-demand type multi-recording head), the difference between bleeding, white haze, a black image area formed by overlaying of the color ink and the black ink, and the black image area formed by the single black ink in the ink sets of Examples and Comparative Examples described above was evaluated employing the method and a standard described below.

For reference, the treatment of "Bk: 100% duty, Col: 15% duty" means, for example, the black ink is applied to a 100% area of the image area and the color ink is applied to a 15% area of the image area. On the other hand, in case of applying the color ink to the 15% area of the image area, in Example 1, Comparative Example 1, and Comparative Example 2, C, M, and Y were all 5% were applied, respectively and in Example 2, only C is applied 15%.

Bleeding and white haze

Figure 17:
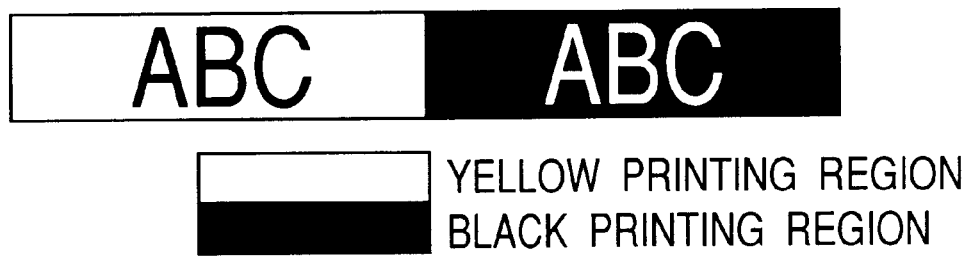
FIG. 17 is a printing pattern used for an evaluation experiment of bleeding and white haze.

As a printing pattern, that, as shown in the FIG. 17, in which the color and black areas were in an adjacent position, was printed to evaluate visually bleeding on the boundary region and white haze in the black area.

In this case, treatment was carried out to make the black image area to Bk: 100% duty, Col: 15% duty.

Evaluation standard for bleeding

A: no bleeding on the boundary region

B: bleeding somewhat found

C: bleeding considerably found

Evaluation standard for white haze

A: no white haze

B: white haze somewhat found

C: white haze found entirely

Difference in density of the black image area

Figure 18:
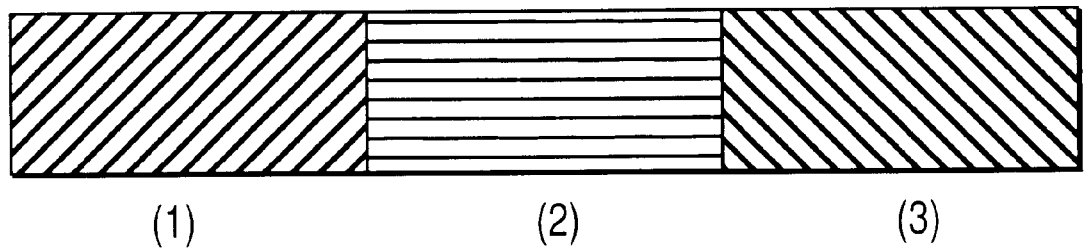
FIG. 18 is an image pattern used for the evaluation experiment of the density difference in the black image region by image processing.

The printing pattern, as shown in the FIG. 18, in which three kinds, (1) Bk: 100% duty, (2) Bk: 100% duty, Col: 5% duty, and (3) Bk: 100% duty, Col: 15% duty, of the black solid areas were in an adjacent position, was made to evaluate visually difference in density and evenness of images.

Evaluation standard for difference in density

A: boundary of black solid is not distinct, but showing evenness

B: boundary of black solid is not distinct, but not showing evenness

C: boundary of black solid is distinct

Result of evaluation

| | Bleeding | White haze | Difference in density |
|---|---|---|---|
| Ex. 1 | A | A | A |
| Ex. 2 | A | A | A |
| Comparative Ex. 1 | A | A | C |
| Comparative Ex. 2 | C | B | B |

From the above result, it was made sure that in the case where the image is formed by using the ink sets according to the present invention, not only bleeding and white haze can be prevented and but also the image can be obtained without density difference and having evenness between the black image area formed by the single black ink and the black image area formed by overlaying of the color ink and the black ink.

(Yellow ink 3: Y3)

| | |
|---|---|
| Ethylene oxide-added acetylene glycol (commercial name, "Acetylenol EH"; made by Kawaken Fine Chemicals Corp.) | 1.0 part |
| Ethylene urea | 6 parts |
| 2-pyrrolidon | 6 parts |
| Ethanol | 5 parts |
| C. I. Direct Yellow 132 | 3 parts |
| Magnesium nitrate salt | 2 parts |
| Water | balance |

(Magenta ink 3; M3)

| | |
|---|---|
| Ethylene oxide-added acetylene glycol(commercial name, "Acetylenol EH"; made by Kawaken Fine Chemicals Corp.) | 1.0 part |
| Ethylene urea | 6 parts |
| 2-pyrrolidon | 6 parts |
| Ethanol | 5 parts |
| Compound Example 7 | 3 parts |
| Compound Example 8 | 1 part |
| C. I. Acid Red 289 | 0.1 parts |
| Magnesium nitrate salt | 3 parts |
| Water | balance |

(Cyan ink 3: C3)

| | |
|---|---|
| Ethylene oxide-added acetylene glycol (commercial name, "Acetylenol EH"; made by Kawaken Fine Chemicals Corp.) | 1.0 part |
| Ethylene urea | 6 parts |
| 2-pyrrolidon | 6 parts |
| Ethanol | 5 parts |
| C. I. Direct Blue 199 | 3.5 parts |
| C. I. Acid blue 9 | 0.3 parts |
| Magnesium nitrate salt | 3 parts |
| Water | balance |

(Cyan ink 4; C4)

| | |
|---|---|
| Ethylene oxide-added acetylene glycol (commercial name, "Acetylenol EH"; made by Kawaken Fine Chemicals Corp.) | 1.0 part |
| Ethylene urea | 6 parts |
| 2-pyrrolidon | 6 parts |
| Ethanol | 5 parts |
| C. I. Direct Blue 199 | 1.5 parts |
| Magnesium nitrate salt | 3 parts |
| Water | balance |

(Absorbance)

In C3 and C4, absorbance at the maximum absorption wavelength in the visible light range was measured. As a result, the maximum absorption wavelength and absorbance of C3 measured 621.5 nm and 1.10, respectively.

The maximum absorption wavelength and absorbance of C4 measured 615.5 nm and 0.38, respectively and C3 had almost same color tone as that of C4. An absorbance ratio of C4 to C3 was C4/C3=0.347≧1/20.

(1) Reflection density-remaining ratio and ΔE

The inks of Y3, M3, C3, and C4 were filled in the printer and the solid part with reflection density 1.0 of each color was printed on a glossy paper (PR-101, made by Canon Inc.) and then, a printed matter was air-dried for 24 hours followed by light resistance test by employing a xenon fade meter Ci3000 (made by Atlas Co.), after covering with a glass cover. Illuminance was 63 klux and illumination duration was 100 hours.

Other a lamp, the filter, a temperature in the container, and humidity were in accordance with the condition of ISO10977, the solar light passed through the window in the room (temperature in the container was 25° C. and relative humidity was 55%). Illuminance is 6 klux by the ISO standard; however, if the test is conducted under 6,000 klux/hr or stronger, illumination results in a prolonged testing time and hence, was carried out under 63 klux and 100 hours to confirm no contradiction under the same illuminance. Before and after the test, the reflection density and color coordinate L*, a*, and b* of the solid part of the printed matter were measured by a reflection density meter X-Rite 938 (commercial name; made by X-Rite Co.) to calculate reflection density-remaining ratio and light light property ΔE in accordance with the formula 1 as described before. The result is shown in the following Table 3.

TABLE 3

| Remaining OD ratio, ΔE | Y3 | M3 | C3 | C4 |
|---|---|---|---|---|
| Remaining OD ratio | 96 | 91 | 92 | 92 |
| ΔE | 3 | 4 | 5 | 3 |

(2) Color balance

Each ink set in the combination predetermined and presented in the following Table 4 was prepared in the printer, the ink for each ink set was filled in an ink container of the ink jet recording apparatus to print a full color image on the glossy paper (PR-101, made by Canon Inc.) using each ink filled.

TABLE 4

| Example | Bk | C | M | Y |
|---|---|---|---|---|
| 3 | Bk1 | C3 | M3 | Y3 |
| 4 | Bk2 | C3 | M3 | Y3 |

Following 24-hour air drying after printing, the light resistance test as the same as the light resistance test described above was carried out. The color balance of the printed matter after the test was visually observed for evaluation.

As a result, no problem rose in the color balance in any combination.

What is claimed is:

1. A recording unit comprising an ink housing part for housing an ink containing a coloring material and an aqueous medium, and an ink jet head part for discharging an ink droplet of the ink, wherein at least one color of the ink is a polyvalent metal salt containing ink; the ink jet head part has a configuration comprised of a substrate having on a base body, a heat-generating resistor member forming a heat-generating part, an electrode wire electrically connected to the heat-generating resistor member, and a cavitation resistant film provided on the heat-generating resistor member and the electrode wire via an insulating protection layer, and a liquid flow path communicating with a discharge port for discharging an ink droplet provided corresponding to the heat-generating part; and the cavitation resistant film comprises a first layer comprised of an amorphous alloy containing Ta and a second layer comprised of an amorphous body of an amorphous alloy which is richer in Ta than the amorphous alloy containing Ta or a passive matter of the amorphous body provided on the first layer.

2. The recording unit according to claim 1, wherein the ink housing part further comprises a black ink housing part for housing a black ink and an ink jet head part for discharging the black ink, and wherein the black ink contains a salt, an aqueous medium, and a pigment dispersed in the aqueous medium by an action of an ionic group; the polyvalent metal salt containing ink is a color ink; and the polyvalent metal salt functions as a component to lower the dispersion stability of the pigment of the black ink.

3. The recording unit according to claim 2, wherein the black ink contains an anionic group as the ionic group.

4. The recording unit according to claim 1, wherein the polyvalent metal salt contains at least one polyvalent metal cation selected from the group consisting of $Mg^{2+}$, $Ca^{2+}$, $Cu^{2+}$, $Co^{2+}$, $Ni^{2+}$, $Fe^{2+}$, $La^{3+}$, $Nd^{3+}$, $Y^{3+}$, and $Al^{3+}$.

5. The recording unit according to claim 1, wherein the content of the polyvalent metal salt is 0.1 to 15% by weight on the basis of the total weight of the ink.

6. The recording unit according to claim 1, wherein the Ka value of the black ink according to the Bristow method is less than $1.5 \text{ mL·m}^{-2}\text{·msec}^{-\frac{1}{2}}$ and the Ka value of the color ink according to the Bristow method is not less than $5 \text{ mL·m}^{-2}\text{·msec}^{-\frac{1}{2}}$.

7. The recording unit according to claim 6, wherein the Ka value of the black ink according to the Bristow method is not less than $0.2 \text{ mL·m}^{-2}\text{·msec}^{-\frac{1}{2}}$ but less than $1.5 \text{ mL·m}^{-2}\text{·msec}^{-\frac{1}{2}}$.

8. The recording unit according to claim 2, wherein the salt contained in the black ink is at least one selected from the group consisting of $(M1)_2SO_4$, $CH_3COO(M1)$, Ph—COO(M1), $(M1)NO_3$, $(M1)Cl$, $(M1)Br$, $(M1)I$, $(M1)_2SO_3$, and $(M1)_2CO_3$ wherein M1 is an alkali metal, ammonium or organic ammonium.

9. The recording unit according to claim 1, wherein the coloring material of the black ink is carbon black to a surface of which at least one hydrophilic group as the ionic group is bound directly or through a group.

10. The recording unit according to claim 1, wherein the black ink contains carbon black as the coloring material and further contains a dispersing agent comprising the ionic group.

11. The recording unit according to claim 8, wherein the content of carbon black in the black ink is such that when forming an image only with the black ink, a predetermined optical density that can not be achieved without incorporation of the salt can be achieved.

12. The recording unit according to claims 2, wherein the coloring material of the color ink is an acid dye or direct dye.

13. The recording unit according to claim 12, wherein the light fading property of the color of the color ink in a light resistance test under such conditions as to cause a fading corresponding to indoor light fading for more than three years is such that the difference in ΔE in the CIELAB color space indication system is 10 or less.

14. The recording unit according to claim 12, wherein the light fading property of the color of each ink is 70% or more in terms of the reflection density remaining percentage after the indoor light fading for more than three years in the light resistance test.

15. The recording unit according to claim 12, wherein when a light resistance test of the inks is conducted under such conditions as to cause fading corresponding to simulated indoor window-passing sunlight fading for more than three years, the light fading property of the color of each ink in the CIELAB color space indication system is 80% or more in terms of the reflection density remaining percentage.

16. The recording unit according to claim 12, wherein the irradiation dose supposed for the indoor window-passing sunlight in the light resistance test is 6,000 klux·hr or more.

17. The recording unit according to claim 12, wherein the light resistance test is conducted under the conditions supposing the indoor window-passing sunlight according to the ISO standard.

18. The recording unit according to claim 12, wherein the light resistance test is conducted for an image formed using a special medium as a recording medium for the inks.

19. The recording unit according to claim 2, wherein the color ink includes at least cyan, magenta, and yellow inks.

20. An ink set as set forth in claim 1, comprising a first color ink and a second color ink of the same color tone as the first color ink, wherein the absorbance at a maximum absorption wavelength in the visible light region of the first color ink is greater than the absorbance at a maximum absorption wavelength in the visible light region of the second color ink.

21. The recording unit according to claim 12, wherein a magenta ink is used which contains at least one coloring material represented by the general formula (I):

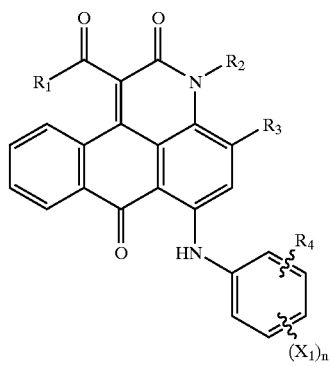
(I)

(wherein $R_1$ represents an alkoxy group, a substituted alkoxy group, an aryl group, or a substituted aryl group; $R_2$ and $R_4$ independently represent a hydrogen atom, an alkyl group, or a substituted alkyl group; $R_3$ represents a hydrogen atom, an alkyl group, a substituted alkyl group, an alkoxy group, a substituted alkoxy group, an aryloxy group, a substituted aryloxy group, or an halogen atom; $X_1$ represents a carboxyl group or a salt thereof or a sulfonic group or a substituted group of a salt thereof; and n represents an integer of 1 to 2).

22. The recording unit according to claim 12, wherein a magenta ink is used which contains at least one of a coloring material of the general formula (I), a coloring material of the general formula (II), the general formula (III), and a coloring material of a xanthene structure:

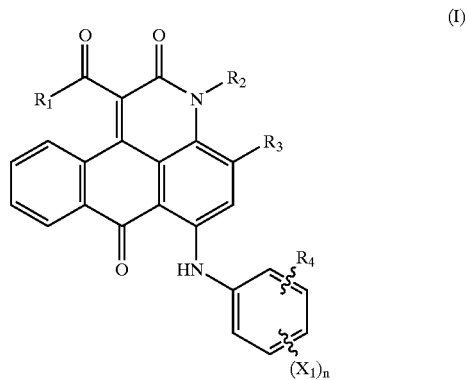
(I)

(wherein $R_1$ represents an alkoxy group, a substituted alkoxy group, an aryl group, or a substituted aryl group; $R_2$ and $R_4$ independently represent a hydrogen atom, an alkyl group, or a substituted alkyl group; $R_3$ represents a hydrogen atom, an alkyl group, a substituted alkyl group, an alkoxy group, a substituted alkoxy group, an aryloxy group, a substituted aryloxy group, or an halogen atom; $X_1$ represents a carboxyl group or a salt thereof or a sulfonic group or a substituted group of a salt thereof; and n represents an integer of 1 to 2);

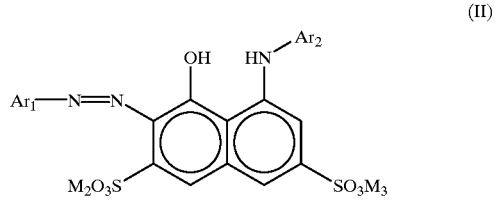
(II)

(wherein $Ar_1$ represents a group having an aryl group having at least one substituent selected from a carboxyl group or a salt thereof and a sulfonic group or a salt thereof, or a substituted or unsubstituted alkyl group; $Ar_2$ represents an acetyl group, a benzoyl group, a 1,3,5-triazine derivative, $SO_2-C_6H_5$ group, or $SO_2-C_6H_4-CH_3$ group; and $M_2$ and $M_3$ are counterions and independently represent an alkali metal, ammonium or organic ammonium); and

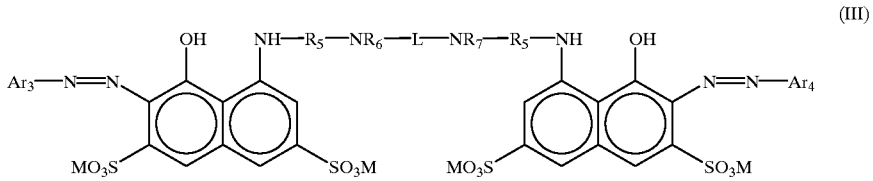

(wherein $Ar_3$ and $Ar_4$ independently represent an aryl group or a substituted aryl group and at least one of $Ar_3$ and $Ar_4$ has a substituent of a carboxyl group or a salt thereof, or a sulfonic group or a salt thereof; M is a counterion and represents an alkali metal, ammonium or organic ammonium; $R_5$ represents 1,3,5-triazine or a 1,3,5-triazine derivative; $R_6$ and $R_7$ independently represent a hydrogen atom, an alkyl group, a substituted alkyl group, an alkenyl group, a substituted alkenyl group, an aralkyl group, or a substituted aralkyl group, or an atomic group which together with the N forms a perhydroxyazine ring; and L represents a divalent organic linking group).

23. The recording unit according to claim 12, wherein as the color ink, a cyan ink is used which contains at least one coloring material having a copper phthalocyanine structure.

24. The recording unit according to claim 12, wherein as the color ink, a cyan ink is used which contains Direct Blue 199 as the coloring material.

25. The recording unit according to claim 12, wherein as the coloring material of the yellow ink, Direct Yellow 132 is used.

26. The recording unit according to claim 1, wherein the coloring material of the color ink is a pigment.

27. The recording unit according to claim 1, wherein the liquid flow path of the ink jet head part has a bubble generating region for generating a bubble in the ink in the liquid flow path and a movable member which is provided facing the bubble generating region and moves in accordance with the growth of the bubble.

28. The recording unit according to claim 27, wherein the liquid flow path further has a regulating part for regulating the movement of the movable member in accordance with the growth of the bubble such that the movable member moves to substantially contact the regulating part, thereby substantially separating the liquid flow path with regard to a direction of flow of the ink to the discharge port.

29. The recording unit according to claim 27, wherein a free end of the movable member is located substantially at a central part of the bubble generating region.

30. An image recording apparatus comprising the recording unit as set forth in claims 1 to 29.

31. A recording unit comprising an ink housing part for housing an ink containing a coloring material and an aqueous medium, and an ink jet head part for discharging an ink droplet of the ink, wherein at least one color of the ink is a polyvalent metal salt containing ink further containing a polyvalent metal salt; the ink jet head part for discharging at least the polyvalent metal salt containing ink has a configuration comprised of a substrate having on a base body, a heat-generating resistor member forming a heat-generating part, an electrode wire electrically connected to the heat-generating resistor member, and a cavitation resistant film provided on the heat-generating resistor member and the electrode wire via an insulating protection layer, and a liquid flow path communicating with a discharge port for discharging an ink droplet provided corresponding to the heat-generating part, and wherein the cavitation resistant film is comprised of at least two layers of an upper layer for contacting the ink comprising Ta or TaAl and a lower layer comprising an amorphous alloy containing Ta.

32. The recording unit according to claim 31, wherein the ink housing part further comprises a black ink housing part for housing a black ink and an ink jet head part for discharging the black ink, and wherein the black ink contains a salt, an aqueous medium, and a pigment dispersed in the aqueous medium by an action of an ionic group; the polyvalent metal salt containing ink is a color ink; and the polyvalent metal salt functions as a component to lower the dispersion stability of the pigment of the black ink.

33. The recording unit according to claim 32, wherein the black ink contains an anionic group as the ionic group.

34. The recording unit according to claim 31, wherein the polyvalent metal salt contains at least one polyvalent metal cation selected from the group consisting of $Mg^{2+}$, $Ca^{2+}$, $Cu^{2+}$, $Co^{2+}$, $Ni^{2+}$, $Fe^{2+}$, $La^{3+}$, $Nd^{3+}$, $Y^{3+}$, and $Al^{3+}$.

35. The recording unit according to claim 31, wherein the content of the polyvalent metal salt is 0.1 to 15% by weight on the basis of the total weight of the ink.

36. The recording unit according to claim 31, wherein the Ka value of the black ink according to the Bristow method is less than $1.5 \text{ mL·m}^{-2}\text{·msec}^{-\frac{1}{2}}$ and the Ka value of the color ink according to the Bristow method is not less than $5 \text{ mL·m}^{-2}\text{·msec}^{-\frac{1}{2}}$.

37. The recording unit according to claim 31, wherein the Ka value of the black ink according to the Bristow method is not less than $0.2 \text{ mL·m}^{-2}\text{·msec}^{-\frac{1}{2}}$ but less than $1.5 \text{ mL·m}^{-2}\text{·msec}^{-\frac{1}{2}}$.

38. The recording unit according to claim 32, wherein the salt contained in the black ink is at least one selected from the group consisting of $(M1)_2SO_4$, $CH_3COO(M1)$, Ph—COO(M1), $(M1)NO_3$, (M1)Cl, (M1)Br, (M1)I $(M1)_2SO_3$, and $(M1)_2CO_3$ wherein M1 is an alkali metal, ammonium or organic ammonium.

39. The recording unit according to claim 31, wherein the coloring material of the black ink is carbon black to a surface of which at least one hydrophilic group as the ionic group is bound directly or through a group.

40. The recording unit according to claim 31, wherein the black ink contains carbon black as the coloring material and further contains a dispersing agent comprising the ionic group.

41. The recording unit according to claim 38, wherein the content of carbon black in the black ink is such that when forming an image only with the black ink, a predetermined optical density that can not be achieved without incorporation of the salt can be achieved.

42. The recording unit according to claim 32, wherein the coloring material of the color ink is an acid dye or direct dye.

43. The recording unit according to claim 42, wherein the light fading property of the color of the color ink in a light resistance test under such conditions as to cause a fading corresponding to indoor light fading for more than three years is such that the difference in ΔE in the CIELAB color space indication system is 10 or less.

44. The recording unit according to claim 42, wherein the light fading property of the color of each ink is 70% or more in terms of the reflection density remaining percentage after the indoor light fading for more than three years in the light resistance test.

45. The recording unit according to claim 42, wherein when a light resistance test of the inks is conducted under such conditions as to cause fading corresponding to simulated indoor window-passing sunlight fading for more than three years, the light fading property of the color of each ink in the CIELAB color space indication system is 80% or more in terms of the reflection density remaining percentage.

46. The recording unit according to claim 42, wherein the irradiation dose supposed for the indoor window-passing sunlight in the light resistance test is 6,000 klux·hr or more.

47. The recording unit according to claim 42, wherein the light resistance test is conducted under the conditions supposing the indoor window-passing sunlight according to the ISO standard.

48. The recording unit according to claim 42, wherein the light resistance test is conducted for an image formed using a special medium as a recording medium for the inks.

49. The recording unit according to claim 32, wherein the color ink includes at least cyan, magenta, and yellow inks.

50. An ink set as set forth in claim 31, comprising a first color ink and a second color ink of the same color tone as the first color ink, wherein the absorbance at a maximum absorption wavelength in the visible light region of the first color ink is greater than the absorbance at a maximum absorption wavelength in the visible light region of the second color ink.

51. The recording unit according to claim 42, wherein a magenta ink is used which contains at least one coloring material represented by the general formula (I):

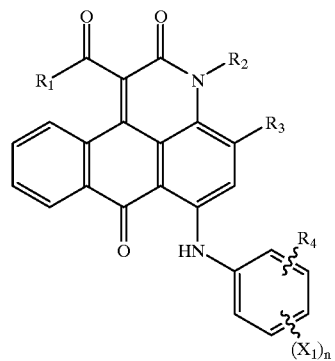

(I)

(wherein $R_1$ represents an alkoxy group, a substituted alkoxy group, an aryl group, or a substituted aryl group; $R_2$ and $R_4$ independently represent a hydrogen atom, an alkyl group, or a substituted alkyl group; $R_3$ represents a hydrogen atom, an alkyl group, a substituted alkyl group, an alkoxy group, a substituted alkoxy group, an aryloxy group, a substituted aryloxy group, or an halogen atom; $X_1$ represents a carboxyl group or a salt thereof or a sulfonic group or a substituted group of a salt thereof; and n represents an integer of 1 to 2).

52. The recording unit according to claim 42, wherein a magenta ink is used which contains at least one of a coloring material of the general formula (I), a coloring material of the general formula (II), the general formula (III), and a coloring material of a xanthene structure:

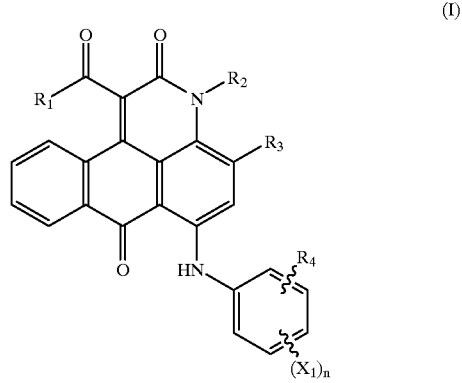

(I)

(wherein $R_1$ represents an alkoxy group, a substituted alkoxy group, an aryl group, or a substituted aryl group; $R_2$ and $R_4$ independently represent a hydrogen atom, an alkyl group, or a substituted alkyl group; $R_3$ represents a hydrogen atom, an alkyl group, a substituted alkyl group, an alkoxy group, a substituted alkoxy group, an aryloxy group, a substituted aryloxy group, or an halogen atom; $X_1$ represents a carboxyl group or a salt thereof or a sulfonic group or a substituted group of a salt thereof; and n represents an integer of 1 to 2);

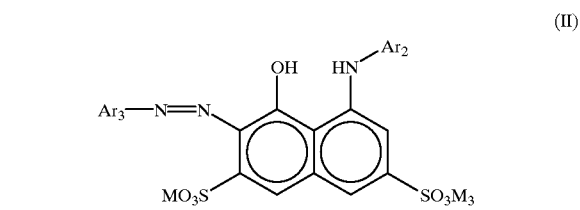

(II)

(wherein $Ar_1$ represents a group having an aryl group having at least one substituent selected from a carboxyl group or a salt thereof and a sulfonic group or a salt thereof, or a substituted or unsubstituted alkyl group: $Ar_2$ represents an acetyl group, a benzoyl group, a 1,3,5-triazine derivative, $SO_2$—$C_6H_5$ group, or $SO_2$—$C_6H_4$—$CH_3$ group; and $M_2$ and $M_3$ are counterions and independently represent an alkali metal, ammonium or organic ammonium); and

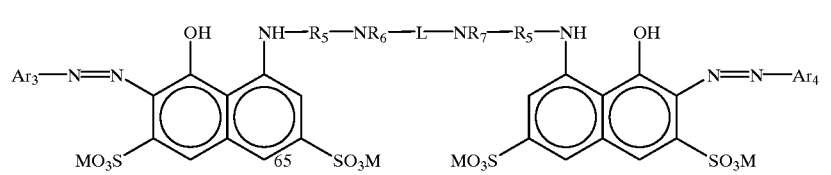

(III)

(wherein $Ar_3$ and $Ar_4$ independently represent an aryl group or a substituted aryl group and at least one of $Ar_3$ and $Ar_4$ has a substituent of a carboxyl group or a salt thereof, or a sulfonic group or a salt thereof; M is a counterion and represents an alkali metal, ammonium or organic ammonium; $R_5$ represents 1,3,5-triazine or a 1,3,5-triazine derivative; $R_6$ and $R_7$ independently represent a hydrogen atom, an alkyl group, a substituted alkyl group, an alkenyl group, a substituted alkenyl group, an aralkyl group, or a substituted aralkyl group, or an atomic group which together with the N forms a perhydroxyazine ring: and L represents a divalent organic linking group).

53. The recording unit according to claim 42, wherein as the color ink, a cyan ink is used which contains at least one coloring material having a copper phthalocyanine structure.

54. The recording unit according to claim 42, wherein as the color ink, a cyan ink is used which contains Direct Blue 199 as the coloring material.

55. The recording unit according to claim 42, wherein as the coloring material of the yellow ink, Direct Yellow 132 is used.

56. The recording unit according to claim 31, wherein the coloring material of the color ink is a pigment.

57. The recording unit according to claim 31, wherein the liquid flow path of the ink jet head part has a bubble generating region for generating a bubble in the ink in the liquid flow path and a movable member which is provided facing the bubble generating region and moves in accordance with the growth of the bubble.

58. The recording unit according to claim 57, wherein the liquid flow path further has a regulating part for regulating the movement of the movable member in accordance with the growth of the bubble such that the movable member moves to substantially contact the regulating part, thereby substantially separating the liquid flow path with regard to a direction of flow of the ink to the discharge port.

59. The recording unit according to claim 57, wherein a free end of the movable member is located substantially at a central part of the bubble generating region.

60. An image recording apparatus comprising the recording unit as set forth in claims 31 to 59.

* * * * *

UNITED STATES PATENT AND TRADEMARK OFFICE
CERTIFICATE OF CORRECTION

PATENT NO.    : 6,582,070 B2
DATED         : June 24, 2003
INVENTOR(S)   : Yoichi Takada et al.

It is certified that error appears in the above-identified patent and that said Letters Patent is hereby corrected as shown below:

<u>Title page,</u>
Item [57], ABSTRACT,
Line 19, "rich" should read -- richer --.

<u>Column 2,</u>
Line 17, "problem" should read -- problem, there is --.
Line 18, "which, all" should read -- which all --.

<u>Column 4,</u>
Line 33, "rapidly" should read -- rapid --; and "left" should read -- leave --.
Line 35, "increase" should read -- is much greater --.
Line 36, "prominently" should be deleted.

<u>Column 5,</u>
Line 47, "the density" should read -- of the density --.

<u>Column 6,</u>
Line 3, "takes" should read -- that takes --.
Line 33, "Where," should read -- Thus, --.
Line 41, "allows being made as small as almost" should read -- can be made so small as to be almost --.
Line 48, "contains" should read -- containing --.
Line 60, "in case" should read -- when --.

<u>Column 7,</u>
Line 13, "Where, the" should read -- Where the --.
Line 27, "as determine" should read -- to determine --.
Line 39, "does not almost change" should read -- almost does not change --.
Line 49, "mount" should read -- amount --.
Line 54, "in case applying" should read -- in the case of applying --.
Line 59, "lower to" should read -- lower than --.
Line 60, "contribute" should read -- contributes --.

<u>Column 8,</u>
Line 1, "method" should read -- methods --.
Line 15, "for that" should read -- for how --.
Line 27, "Immediate after the ink attached to," should read -- Immediately after the ink attaches thereto, --.
Line 60, "rapidly" should read -- rapid --.

UNITED STATES PATENT AND TRADEMARK OFFICE
CERTIFICATE OF CORRECTION

PATENT NO. : 6,582,070 B2
DATED : June 24, 2003
INVENTOR(S) : Yoichi Takada et al.

It is certified that error appears in the above-identified patent and that said Letters Patent is hereby corrected as shown below:

Column 10,
Line 1, "the effect" should read -- of the effect that --.
Line 3, "Where, as" should read -- As --.
Line 21, "quatery" should read -- quaternary --.
Line 55, "the method," should be deleted.

Column 11,
Line 14, "Where, a" should read -- A --.

Column 12,
Line 1, "dispersant" should read -- dispersants --.
Line 32, "match" should read -- matched for use with -- and "particu-" should read -- are particu- --.
Line 66, "applied" should read -- being applied --.

Column 13,
Line 64, "followings" should read -- following --.

Column 14,
Line 4, "diacetonalcol;" should read -- diacetonalcohol; --.
Line 16, "N-methyl-2-pyrrolidon, 2-pyrrolidon," should read -- N-methyl-2-pyrrolidone, 2-pyrrolidone --.
Line 22, "ranges" should read -- it ranges --.
Line 57, "0.05" should read -- (0.05) --.

Column 15,
Line 14, "The ink described above" should read -- For the ink described above, there --.
Line 55, "roughe" should read -- rough --.

Column 17,
Line 14, "defines" should read -- define --.
Line 36, "a" should be deleted.
Line 40, "is" should read -- are --.

Column 21,
Line 12, "liked" should read -- linking --.
Line 40, Compound Example 8, "NH4,NR4)" should read -- $NH_4, NR_4$) --.

Column 22,
Line 65, Compound Example 14, "NH4,NR4)" should read -- $NH_4, NR_4$) --.

UNITED STATES PATENT AND TRADEMARK OFFICE
CERTIFICATE OF CORRECTION

PATENT NO.    : 6,582,070 B2
DATED         : June 24, 2003
INVENTOR(S)   : Yoichi Takada et al.

It is certified that error appears in the above-identified patent and that said Letters Patent is hereby corrected as shown below:

Column 30,
Line 60, "a mount" should read -- amount --.

Column 31,
Line 48, "unstabilize dispersion" should read -- , which unstabilizes dispersion --.
Line 51, "the" (first occurrence) should read -- of the --.
Lines 52 and 55, "may" should read -- may be --.
Line 63, "urea" should read -- urea, --.

Column 33,
Line 26, "a" should read -- an --.
Line 37, "growing" should read -- growing in an --.
Line 50, "low" should read -- below --.

Column 34,
Line 6, "resistant" should read -- resistance --.
Line 8, "is" should be deleted.
Line 15, "that formable" should read -- one able to form --.
Line 19, "communication" should read -- in communication --.
Line 39, "liguid" should read -- liquids --.
Line 41, "very" should read -- greatly --.
Line 42, "film" should read -- film, which is --.
Line 52, "may" should read -- may be --.

Column 35,
Line 3, "is" should read -- are --.
Line 8, "rapidly heat and boil" should read -- that rapidly heats and boils --.
Line 9, "these" should read -- the --.

Column 36,
Line 22, "applies" should read -- apply --.
Line 54, "as U.S. Patent No. 4,429,321" should read -- U.S. Patent No. 4,429,321 shows that --.

Column 37,
Line 12, "increase" should read -- increased --.

Column 38,
Line 10, "a" should be deleted.
Line 67, "in" should be deleted.

UNITED STATES PATENT AND TRADEMARK OFFICE
CERTIFICATE OF CORRECTION

PATENT NO. : 6,582,070 B2
DATED : June 24, 2003
INVENTOR(S) : Yoichi Takada et al.

It is certified that error appears in the above-identified patent and that said Letters Patent is hereby corrected as shown below:

Column 39,
Line 1, "replacing to" should read -- replacing --.
Line 8, "by" should read -- so --.
Line 39, "FIG. 1A and FIG. 1B," should read -- FIG. 7A and FIG. 7B, --.
Line 46, "rank" should read -- tank --.

Column 41,
Line 15, "and" should read -- to --.
Line 25, "become" should read -- becomes --.
Line 33, "in which" should read -- including --.
Line 41, "moves" should read -- moved --.

Column 42,
Line 5, "motor driving" should read -- driving motor --.

Column 47,
Line 16, "Other a lamp," should read -- Otherwise, the lamp, --.
Line 56, "as" should read -- that was --.

Column 48,
Line 62, "claims" should read -- claim --.

Column 50,
Lines 3 and 41, "an" should read -- a --.

UNITED STATES PATENT AND TRADEMARK OFFICE
CERTIFICATE OF CORRECTION

PATENT NO.     : 6,582,070 B2
DATED          : June 24, 2003
INVENTOR(S)    : Yoichi Takada et al.

It is certified that error appears in the above-identified patent and that said Letters Patent is hereby corrected as shown below:

<u>Column 54,</u>
Lines 2 and 35, "an" should read -- a --.

<u>Column 55,</u>
Line 11, "ring:" should read -- ring; --.

Signed and Sealed this

Second Day of December, 2003

JAMES E. ROGAN
*Director of the United States Patent and Trademark Office*